(12) United States Patent
Gasparakis

(10) Patent No.: US 8,982,734 B2
(45) Date of Patent: Mar. 17, 2015

(54) METHODS, APPARATUS, AND SYSTEMS FOR ROUTING INFORMATION FLOWS IN NETWORKS USING SPANNING TREES AND NETWORK SWITCHING ELEMENT RESOURCES

(75) Inventor: Iosif Gasparakis, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 13/532,971

(22) Filed: Jun. 26, 2012

(65) Prior Publication Data

US 2013/0343229 A1    Dec. 26, 2013

(51) Int. Cl.
*H04L 12/28* (2006.01)
*H04L 12/727* (2013.01)
*H04L 12/729* (2013.01)
*H04L 12/751* (2013.01)
*H04L 12/753* (2013.01)
*H04L 12/717* (2013.01)
*H04L 12/721* (2013.01)

(52) U.S. Cl.
CPC ............ *H04L 45/02* (2013.01); *H04L 45/42* (2013.01); *H04L 45/48* (2013.01); *H04L 45/66* (2013.01)
USPC ........... 370/256; 370/255; 370/252; 370/238; 709/241; 709/242

(58) Field of Classification Search
None
See application file for complete search history.

(56) References Cited

U.S. PATENT DOCUMENTS

| | | | | |
|---|---|---|---|---|
| 8,089,866 B2 * | 1/2012 | Smith et al. | ...................... | 370/225 |
| 8,155,030 B2 * | 4/2012 | Farkas et al. | ................... | 370/256 |
| 8,175,009 B2 * | 5/2012 | Tallet et al. | ................... | 370/256 |
| 8,325,630 B2 * | 12/2012 | Khan et al. | ..................... | 370/256 |
| 8,438,305 B2 * | 5/2013 | Ashwood Smith | ........... | 709/238 |
| 8,509,075 B2 * | 8/2013 | Eswaran et al. | ............... | 370/235 |
| 8,553,566 B2 * | 10/2013 | Yi et al. | ........................ | 370/242 |
| 8,625,466 B2 * | 1/2014 | Miller | .......................... | 370/256 |

(Continued)

FOREIGN PATENT DOCUMENTS

WO      2013/169258 A1    11/2013

OTHER PUBLICATIONS

International Search Report and Written Opinion received for PCT Patent Application No. PCT/US2013/044618, mailed on Nov. 13, 2013, 13 pages.

(Continued)

*Primary Examiner* — Candal Elpenord
(74) *Attorney, Agent, or Firm* — Law Office of R. Alan Burnett, P.S.

(57) ABSTRACT

Methods, apparatus and systems for routing information flows in networks based on spanning trees and network switching element resources. One or more controllers are used to assign information flows to network switching elements (NSEs) through use of spanning trees derived from link path costs. NSEs generate status information relating to resources they employ to facilitate information flows that is sent to the controller(s). The status information is used to derive link costs, which are then used to generate spanning trees that support routing between the NSEs without any path loops. Information flows are assigned to the NSEs such that the routing paths for the flows use the links in the spanning tree. The link costs and spanning trees are dynamically computed during ongoing operations, enabling the network routing and flow assignments to be reconfigured in response to dataplane events and changes to the information flow traffic.

25 Claims, 26 Drawing Sheets

(56) References Cited

U.S. PATENT DOCUMENTS

| | | | |
|---|---|---|---|
| 8,630,303 B2* | 1/2014 | Khan et al. | 370/406 |
| 2002/0027887 A1 | 3/2002 | Moriya | |
| 2003/0235158 A1 | 12/2003 | Lee et al. | |
| 2005/0254448 A1 | 11/2005 | Tang et al. | |
| 2006/0109801 A1* | 5/2006 | Ashwood Smith | 370/256 |
| 2007/0002738 A1* | 1/2007 | McGee | 370/230 |
| 2008/0002681 A1 | 1/2008 | Bajic et al. | |
| 2010/0020726 A1* | 1/2010 | Chu et al. | 370/256 |
| 2011/0222440 A1* | 9/2011 | Phillips et al. | 370/256 |
| 2011/0310894 A1 | 12/2011 | Karino | |
| 2011/0317559 A1 | 12/2011 | Kern et al. | |
| 2012/0020361 A1 | 1/2012 | Ueno | |
| 2012/0113871 A1 | 5/2012 | Bulusu | |

OTHER PUBLICATIONS

International Search Report and Written Opinion received for PCT Application No. PCT/US2012/037329, mailed on Feb. 14, 2013, 11 pages.

* cited by examiner

| Link | Processors (W1) | Flows (W2) | FPS (W3) | Drop rate (W4) | Bandwidth % (W5) | Ports (W6) | Cost |
|---|---|---|---|---|---|---|---|
| 2-I | Data... | Data... | Data... | Data... | Data... | Data... | 1 |
| 2-H | Data... | Data... | Data... | Data... | Data... | Data... | 1 |
| 3-A | Data... | Data... | Data... | Data... | Data... | Data... | 1 |
| 3-B | Data... | Data... | Data... | Data... | Data... | Data... | 1 |
| 3-C | Data... | Data... | Data... | Data... | Data... | Data... | 1 |
| 3-D | Data... | Data... | Data... | Data... | Data... | Data... | 1 |
| 4-C | Data... | Data... | Data... | Data... | Data... | Data... | 1 |
| 4-D | Data... | Data... | Data... | Data... | Data... | Data... | 1 |
| 4-G | Data... | Data... | Data... | Data... | Data... | Data... | 1 |
| 5-H | Data... | Data... | Data... | Data... | Data... | Data... | 1 |
| 5-J | Data... | Data... | Data... | Data... | Data... | Data... | 1 |
| 6-E | Data... | Data... | Data... | Data... | Data... | Data... | 1 |
| 6-H | Data... | Data... | Data... | Data... | Data... | Data... | 1 |
| 7-E | Data... | Data... | Data... | Data... | Data... | Data... | 1 |
| 7-F | Data... | Data... | Data... | Data... | Data... | Data... | 1 |
| 9-A | Data... | Data... | Data... | Data... | Data... | Data... | 1 |
| 9-B | Data... | Data... | Data... | Data... | Data... | Data... | 1 |
| 9-C | Data... | Data... | Data... | Data... | Data... | Data... | 1 |
| 10-F | Data... | Data... | Data... | Data... | Data... | Data... | 1 |
| 10-G | Data... | Data... | Data... | Data... | Data... | Data... | 1 |
| 11-A | Data... | Data... | Data... | Data... | Data... | Data... | 1 |
| 11-F | Data... | Data... | Data... | Data... | Data... | Data... | 1 |
| 14-G | Data... | Data... | Data... | Data... | Data... | Data... | 1 |
| 14-I | Data... | Data... | Data... | Data... | Data... | Data... | 1 |
| 14-J | Data... | Data... | Data... | Data... | Data... | Data... | 1 |

*Fig. 11a*

| Link | Processors (W1) | Flows (W2) | FPS (W3) | Drop rate (W4) | Bandwidth % (W5) | Ports (W6) | Cost |
|---|---|---|---|---|---|---|---|
| 2-I | Data... | Data... | Data... | Data... | Data... | Data... | 1 |
| 2-H | Data... | Data... | Data... | Data... | Data... | Data... | 1 |
| 3-A | Data... | Data... | Data... | Data... | Data... | Data... | 1 |
| 3-B | Data... | Data... | Data... | Data... | Data... | Data... | 3 |
| 3-C | Data... | Data... | Data... | Data... | Data... | Data... | 2 |
| 3-D | Data... | Data... | Data... | Data... | Data... | Data... | 1 |
| 4-C | Data... | Data... | Data... | Data... | Data... | Data... | 1 |
| 4-D | Data... | Data... | Data... | Data... | Data... | Data... | 1 |
| 4-G | Data... | Data... | Data... | Data... | Data... | Data... | 1 |
| 5-H | Data... | Data... | Data... | Data... | Data... | Data... | 3 |
| 5-J | Data... | Data... | Data... | Data... | Data... | Data... | 1 |
| 6-E | Data... | Data... | Data... | Data... | Data... | Data... | 4 |
| 6-H | Data... | Data... | Data... | Data... | Data... | Data... | 3 |
| 7-E | Data... | Data... | Data... | Data... | Data... | Data... | 1 |
| 7-F | Data... | Data... | Data... | Data... | Data... | Data... | 1 |
| 9-A | Data... | Data... | Data... | Data... | Data... | Data... | 2 |
| 9-B | Data... | Data... | Data... | Data... | Data... | Data... | 1 |
| 9-C | Data... | Data... | Data... | Data... | Data... | Data... | 1 |
| 10-F | Data... | Data... | Data... | Data... | Data... | Data... | 1 |
| 10-G | Data... | Data... | Data... | Data... | Data... | Data... | 1 |
| 11-A | Data... | Data... | Data... | Data... | Data... | Data... | 3 |
| 11-F | Data... | Data... | Data... | Data... | Data... | Data... | 1 |
| 14-G | Data... | Data... | Data... | Data... | Data... | Data... | 1 |
| 14-I | Data... | Data... | Data... | Data... | Data... | Data... | 1 |
| 14-J | Data... | Data... | Data... | Data... | Data... | Data... | 1 |

*Fig. 11b*

METHODS, APPARATUS, AND SYSTEMS FOR ROUTING INFORMATION FLOWS IN NETWORKS USING SPANNING TREES AND NETWORK SWITCHING ELEMENT RESOURCES

CROSS-REFERENCE TO RELATED APPLICATIONS

This application contains subject matter that is related to subject matter disclosed in PCT Application Serial No. PCT/US2012/037329, entitled NETWORK ROUTING BASED ON RESOURCE AVAILABILITY, filed May 10, 2012, having the same inventor and assignee.

TECHNICAL FIELD

The field of invention relates generally to computer networks, and, more specifically but not exclusively relates to techniques for routing information flows in networks based on spanning trees and network switching element resources.

BACKGROUND ART

Computer networks are ubiquitous in today's society. Common activities such as having a phone conversation, browsing the Internet, processing a computer-based purchase order, tweeting a friend, viewing a YouTube® video, and posting a Facebook® status update are facilitated through use of one or more computer networks. Moreover, future use of computer networks is forecast to increase substantially, as more work and social activities will involve use of cloud-based services.

The most widely used computer network, the Internet, is actually a massive collection of independent smaller packet-switched networks that are interconnected with no central control facility. The lack of a central control facility necessitates that the network switching elements (NSEs, e.g., switches, routers, bridges, etc.) perform dynamic packet-switched routing operations using built-in control logic and routing tables. To facilitate this, various communication protocols have been developed, generally based on the OSI (Open System Interconnection) model, and the NSEs are configured to implement these protocols. OSI defines a seven-layer model including three media layers and four host layers. The media layers comprise a Physical Layer (Layer 1), a Data Link Layer (Layer 2), and a Network Layer (Layer 3), while the host layers comprise a Transport Layer (Layer 4), a Session Layer (Layer 5), a Presentation Layer (Layer 6), and an Application Layer (Layer 7). Media layer functionality is facilitated by the NSEs, while host layer functionality is typically implemented by software running on a host computer. Due to their inherent Network Layer functionality, NSEs are commonly referred to as Layer 3 switches. Under a Layer 3 network architecture, both the control plane and data plane are implemented by the NSEs.

Recently, there has been a greater emphasis on the use of network information flows as opposed to the dynamically determined hop-to-hop packet routing used in Layer 3 networks. While some flow-based routing intelligence has been added to more sophisticated NSEs, the implementation of network flows typically is facilitated through use of a central controller or a distributed set of controllers that are used to control routing operations implemented by the NSEs. Thus, under this network architecture, control plane operations are implemented by the central controller or distributed controllers, while data plane operations remain implemented by the NSEs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 1b, 1c, and 1d show three exemplary spanning trees corresponding to the network of FIGS. 1 and 1a;

FIGS. 11a and 11b show an example of a table used to store parameters derived from status information used to compute link costs, wherein the table in FIG. 11a corresponds to a first link configuration for FIG. 9a under which each link has a cost of '1" and the table in FIG. 11b shows a change in the link costs for links corresponding to the link cost configuration shown in FIG. 9e;

FIG. 14b is a rear isometric view of the blade server chassis of FIG. 14a;

DESCRIPTION OF THE EMBODIMENTS

Embodiments of methods, apparatus and systems for routing information flows in networks based on spanning trees and network switching element resources are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Networks, as referred to herein, may generally include any packet-switched network such as, for example, Ethernet networks as set forth in the IEEE 802.3 standard. Embodiments may further employ a software-based switching system designed to interact with features already present in existing network devices to control information routing in packet-switched networks. The various network links illustrated and described herein may be implemented over either wired or optical physical links using associated physical layers and interfaces.

OpenFlow, as set forth in the OpenFlow Switch Specification Version 1.2 (December 2011), is an example of a software-based switching system that was developed for operation on packet-switched networks such as Ethernet. OpenFlow may interact using features common to network devices that are not manufacturer-specific (e.g., internal flow tables) to provide controlled switching at substantially normal operational speeds. In particular, OpenFlow provides a secure interface for controlling the information routing behavior of various commercial Ethernet switches, or similar network devices, regardless of the device manufacturer. Any reference to OpenFlow in discussion of embodiments herein is meant only for illustrative and explanation purposes, and is not intended to limit the various embodiments to implementations only through use of OpenFlow. On the contrary, the various embodiments may be implemented with any software and/or hardware-based solution configured to provide flow control in a network. For example, the various embodiments, as disclosed herein, would be readily applicable to any interconnected communication system having high data throughput.

Figure 1:
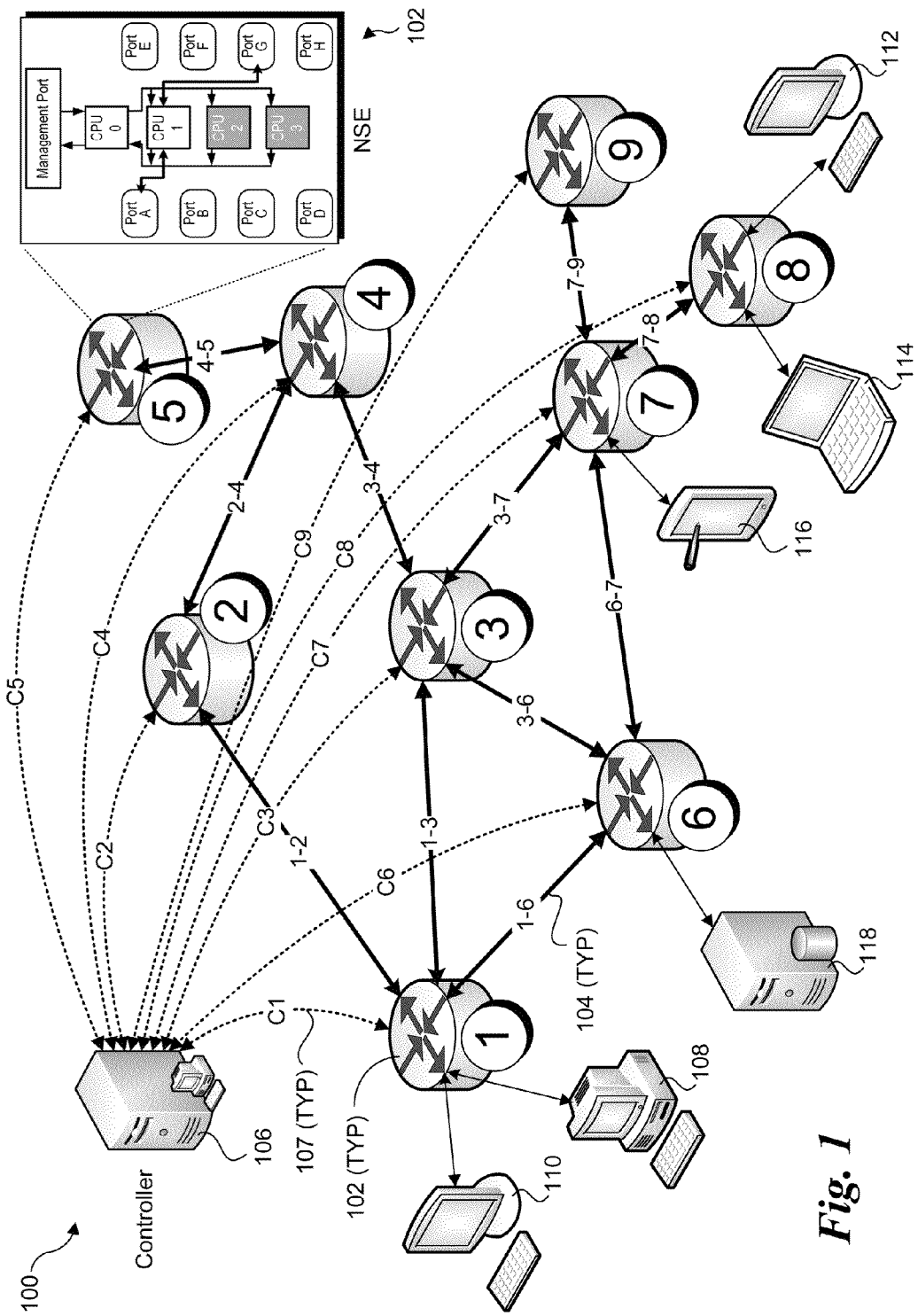
FIG. 1 is a schematic diagram of a system including a network including a plurality of network switching elements (NSEs) comprising nodes interconnected via links and a controller that is configured to assign information flows to the NSEs, in accordance with at least one embodiment of the present disclosure.

FIG. 1 illustrates an exemplary system including a network 100 in which aspects of the embodiments described herein may be implemented. Network 100 includes nine NSEs 102, which are also labeled with a corresponding node number (1-9) and referred to as "NSE nodes" or simply "nodes". For convenience, reference herein to an NSE node number also is a reference to a NSE 102 corresponding to the node number. The various NSE nodes are interconnected via network links 104, wherein each network link is labeled with two digits separated by a dash with the digits identifying the NSE nodes coupled in communication via the link. For example, the network link between NSE nodes 1 and 2 is labeled 1-2. In addition each of NSE nodes 1-9 is linked in communication to a controller 106 via a respective secure channel link 107 labeled CN, where N corresponds to the node number.

In general, various types of computing devices may be communicatively coupled to the NSE nodes, such as illustrated by a desktop computer 108, all-in-one computers 110 and 112, a laptop computer 114, and a tablet computer 116. Other computing devices that may be coupled to NSE nodes include but are not limited to mobile communication devices such as a smartphone based on the Android® operating system (OS), Apple iOS®, Blackberry® OS, Symbian® OS, Microsoft Windows Phone®, Palm® OS, etc., mobile computing devices such as an iPad®, Samsung Galaxy Tab®, Kindle Fire®, etc., ultrabooks, netbooks and notebook computers. In addition, various types of servers may be communicatively coupled to the NSE nodes, such as illustrated by a database server 118. Other types of servers include but are not limited to Web servers, application servers, Microsoft Windows servers, Linux servers, certificate servers, proxy servers, Active Directory servers, file servers, print servers, FTP servers, and e-mail servers. Generally, a given computing device may be communicatively coupled to a NSE node directly (e.g., via an Ethernet link) or indirectly through a device that is communicatively coupled to a NSE node (e.g., via a wireless link to an access point or the like coupled to a NSE node). NSE nodes also may be coupled to various types of gateways, bridges, switches, and routers (not shown).

Figure 2:
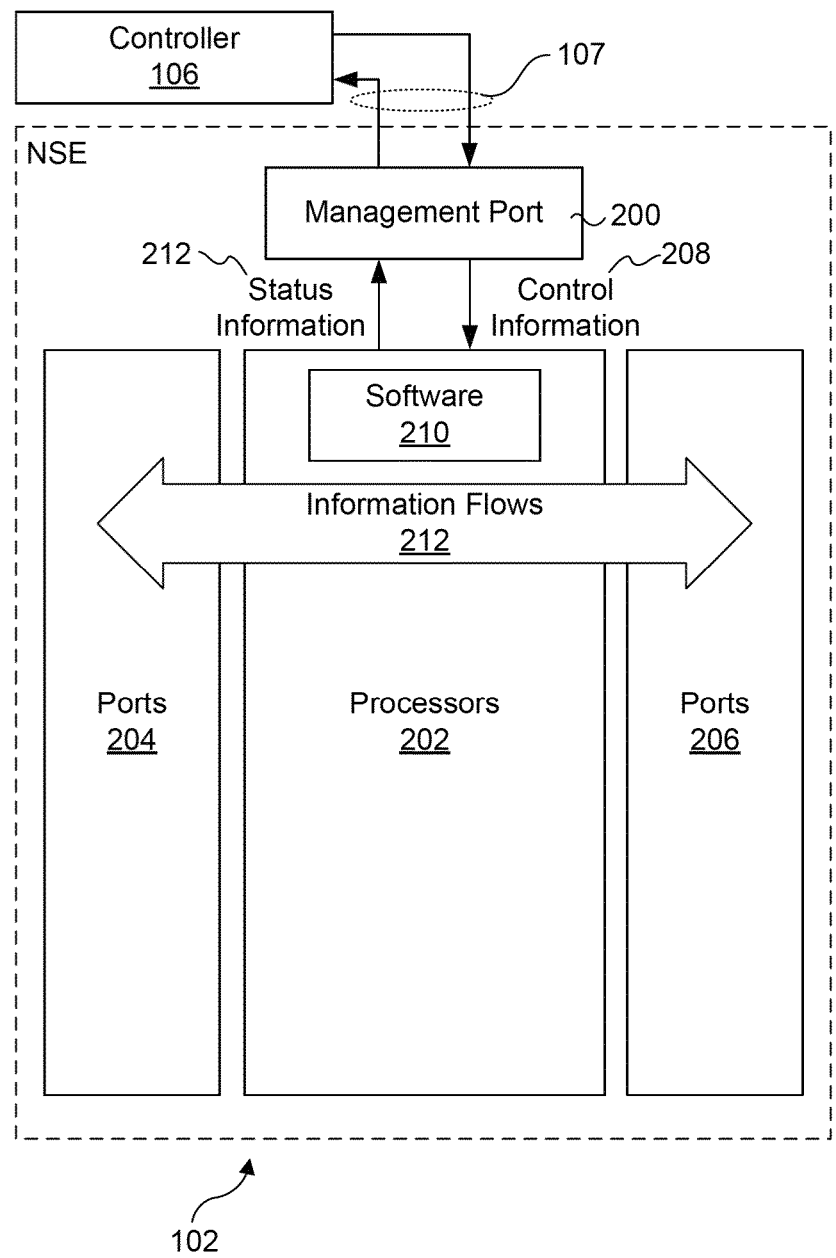
FIG. 2 illustrates an example system configured for network routing based on spanning trees and resource availability in accordance with at least one embodiment of the present disclosure.

FIG. 2 shows an abstracted depiction of an NSE 102, according to one embodiment. As illustrated, NSE 102 includes a management port 200, one or more processors 202, and network ports 204 and 206. When NSE 102 is deployed, management port 200 is communicatively coupled to controller 106 via a secure channel link 107. This enables controller 106 to provide control information 208 for NSE 102 to one or more software components 210 running on processors 202 and receive status information 212 for NSE 102 from software components 210. In one embodiment NSE 102 comprises a software-based switch configured to interact with controller 102. In some embodiments, the software-base switch functionality for NSEs described herein may be implemented on various types of devices, including devices dedicated to supporting communications on a packet-switched network such as a network switch, router, gateway or other similar network-specific device.

In instances where OpenFlow is being employed, the OF-CONFIG protocol may be utilized to associate OpenFlow-related resources in a physical device (e.g., processors 202 and ports 204 and 206) with a software-based switch such as, for example, NSE 102. OF-CONFIG does not determine how the resources will be assigned in the device, but rather associates the device resources and allows the software-based switch (e.g., NSE 102) to have control over how the resources will be utilized. Ports 204 and Ports 206 may be application-specific or process-specific addressable locations in NSE 102 from which information flows 212 (e.g., at least one digital data transmission unit such as a packet, frame, etc.) may originate, or alternatively, to which information flows 212 may be delivered. Processors 202 is generally illustrative of one or more processing resources (e.g., central processing units, processor cores, etc.) that may be employed to execute software 210 that is configured to process information flows 212. Generally, processing information flows 212 may include conveying information flows received as an input at one or network ports 204 and 206 and output via another one of the network ports. For illustrative purposes a double-headed arrow is shown in FIG. 2, but it will be understood that the depiction of network ports 204 and 206 correspond to logical ports rather than the physical location of such ports on an NSE.

Management port 200 may be configured to allow controller 106 to communicate with NSE 102. Management port 200 may include a secure channel 107, such as in instances where OpenFlow is being employed, over which controller 106 and NSE 102 may communicate. Secure channel 107 may generally comprise a private, dedicated channel (such as a management channel) that is implemented for control/management purposes, or a network link over which control and status information may be sent. In one embodiment management port 200 may physically comprise one of network ports 204 and 206 that is logically mapped to a predefined HTTP/HTTPS port configured for control/management messaging, such as HTTPS management port 443, or a port configured for implementing an encrypted protocol such as SSL and/or use of VPN (Virtual Private Network) protocols. Although depicted in FIG. 1 as direct links between controller 106 and the NSEs, the various secure channel 107 links may be coupled to various switching and routing resources (not shown) that are configured for routing and forwarding control/management messages.

In one embodiment, NSE 102 may transmit status information 212 to controller 106 via management port 200, and may further receive control information 208 from controller 106 via management port 200. Status information 212 may include, but it not limited to, capability information and/or utilization information for processors 202. For example, capability information for processors 202 may include, but is not limited to, the total number of processors, a type (e.g., manufacturer, model, category, technology, etc.) for the processors, a processor speed, a maximum throughput (e.g., bandwidth), etc. Utilization information may include, but is not limited to, current statistics corresponding to processors 202 and/or network ports 204/206 such as, for example, percent utilization of processors 202, frames per second (fps) per processor 202 and/or network port 204/206, dropped frames per processor 202 or network port 204/206, etc. Control information 208 may include, but is not limited to, permitted operating conditions for processors 202 such as, for example, a permitted percent utilization level for processors 202 including a maximum usage level and/or minimum usage level, a maximum/minimum fps for processors 202, etc. A minimum permitted usage level may prompt information flow reassignment and deactivation of underutilized processors 202, which may reduce energy consumption and allow the deactivated processors 202 to be freed up for other tasks (e.g., in the instance that the device being controlled by NSE 102 is not a dedicated network device). A maximum permitted usage level for processors 202 may result in better per-processor performance, and thus, improved overall performance and quality of service.

Figure 3:
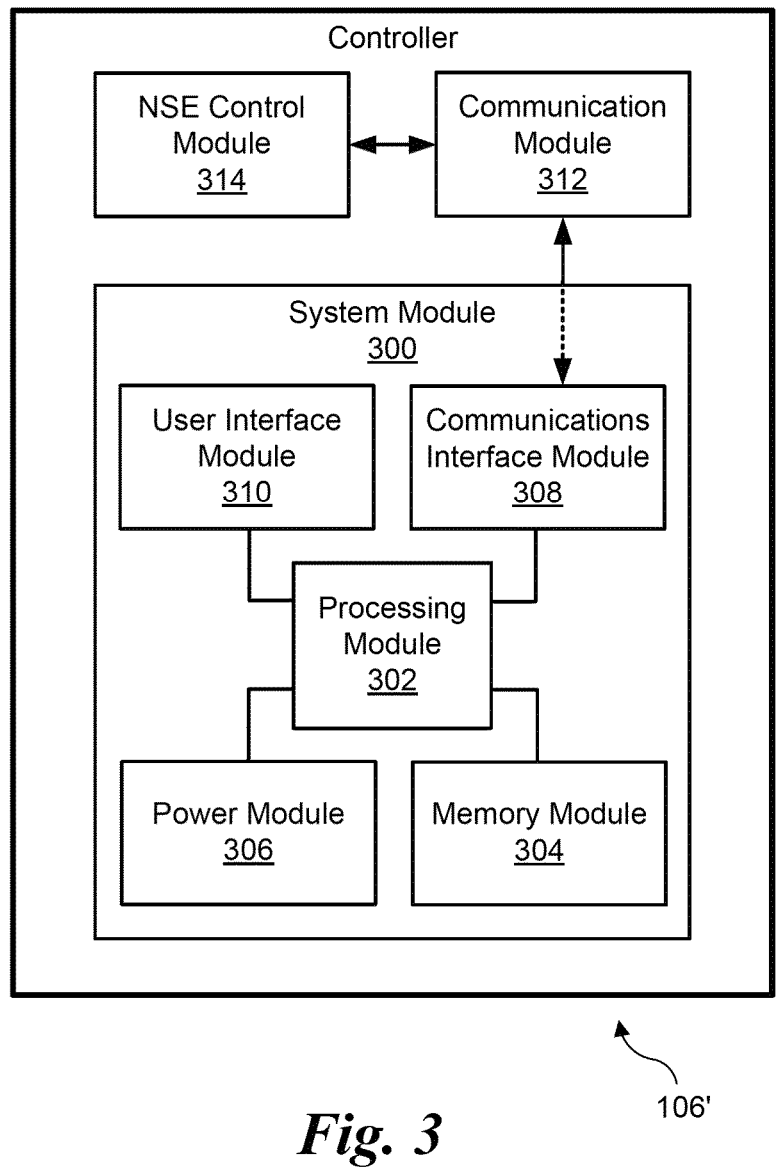
FIG. 3 is a block diagram illustrating an exemplary set of modules configured to be implemented in a controller, in accordance with at least one embodiment of the present disclosure.

FIG. 3 shows a block module diagram of a controller 106', according to one embodiment. Generally, controller 106' may include hardware and software components configured for implementing aspects of the controller-related functionality described herein. These hardware and software and components are depicted in FIG. 2 by modules, each of which may be implemented via one or more hardware and/or software components. The modules include a system module 300 comprising a processing module 302, a memory module 304, a power module 306, a communication interface module 308, and a user interface module 310, communication module 312, and an NSE control module 314.

System module 300 may be configured to perform various functions associated with operation of controller 106'. For example, processing module 302 may comprise one or more processors configured as separate components, or alternatively, may comprise one or more processing cores implemented in an integrated component (e.g., in a System-on-a-Chip (SOC) configuration). Example processors may include, but are not limited to, various x86-based microprocessors available from the Intel® Corporation including those in the Pentium, Xeon, Itanium, Celeron, Atom, Core i-series product families, various ARM-based architecture processors, and other processor architecture employed by processors made by companies such as IBM, Motorola, Texas Instruments, Samsung, NEC, Hewlett-Packard, Sun Microsystems/Oracle and Qualcomm. Processing module 302 may be configured to execute instructions in controller 106'. Instructions may include program code configured to cause processing module 302 to perform operations related to reading data, writing data, processing data, formulating data, converting data, transforming data, etc. Information (e.g., instructions, data, etc.) may be stored in memory module 304. Memory module 304 may generally comprise random access memory (RAM), read-only memory (ROM) and/or a rewritable storage device in a fixed or removable format. RAM may include memory configured to hold information during the operation of controller 106' such as, for example, static RAM (SRAM) or Dynamic RAM (DRAM). ROM may include memories such as bios memory configured to provide instructions for controller 106', programmable memories such as electronic programmable ROMs, (EPROMS), Flash, etc. Other fixed and/or removable rewritable storage devices may include magnetic memories such as floppy disks, hard drives, etc., electronic memories such as solid state flash memory (e.g., eMMC, etc.), removable memory cards or sticks (e.g., uSD, USB, etc.), and optical memories such as compact disc-based ROM (CD-ROM), etc.

Power module 306 is configured to provide power input to various hardware components on controller 106' including processors, memory, and various peripheral components such as communication interfaces. Power module 306 may include internal (e.g., battery) and/or external (e.g., wall plug) power sources and associated power conditioning circuitry, such as transformers, DC-DC convertors, diodes, etc.

Communications interface module 308 may be configured to handle packet routing and various control functions for communication module 312, which may include various resources for conducting wired and/or wireless communications. Wired communications may include mediums such as, for example, Universal Serial Bus (USB, e.g., USB2 or USB3), Thunderbolt, FireWire, Ethernet, etc. Wireless communications may include, for example, close-proximity wireless mediums (e.g., radio frequency (RF), infrared (IR), etc.), short-range wireless mediums (e.g., Bluetooth, wireless local area networking (WLAN), etc.) and long range wireless mediums (e.g., cellular, satellite, etc.).

User interface module 310 may generally include circuitry and/or software configured to enable a user to interact with controller 106', including applicable input and output mechanisms. For example, input mechanisms may include one or more of keyboards, pointer devices, touch-based input devices, switches, buttons, knobs, microphones, etc. Output mechanisms generally include any device that facilitates visual and/or audio information including various types of displays, indicators, and speakers.

In one embodiment, NSE control module 314 may be configured to interact with at least communication module 312. Interaction may include NSE control module 314 being configured to receive status information via communication module 312, to determine control information based on the status information, and to cause communication module 312 to transmit the control information to an NSE 102. In general, NSE control module 314 may perform these actions in response to associated events (e.g., in response to receiving status information from NSE 102), and/or using a schedule (e.g., NSE control module 314 may cause communication module 312 to periodically transmit requests for status information to NSE 102).

The functionality provided by controller 106' may be implemented via various types of computing devices, including fixed devices such as desktop computers, stand-alone or rack-mounted servers, blade servers, and mobile devices such as laptops, notebooks, netbooks, ultrabooks, tablets, mobile phones, PDA's, etc. Accordingly, the configuration of the various modules depicted for controller 106' will generally depend on the particular type of device used to implement the controller.

Figure 4:
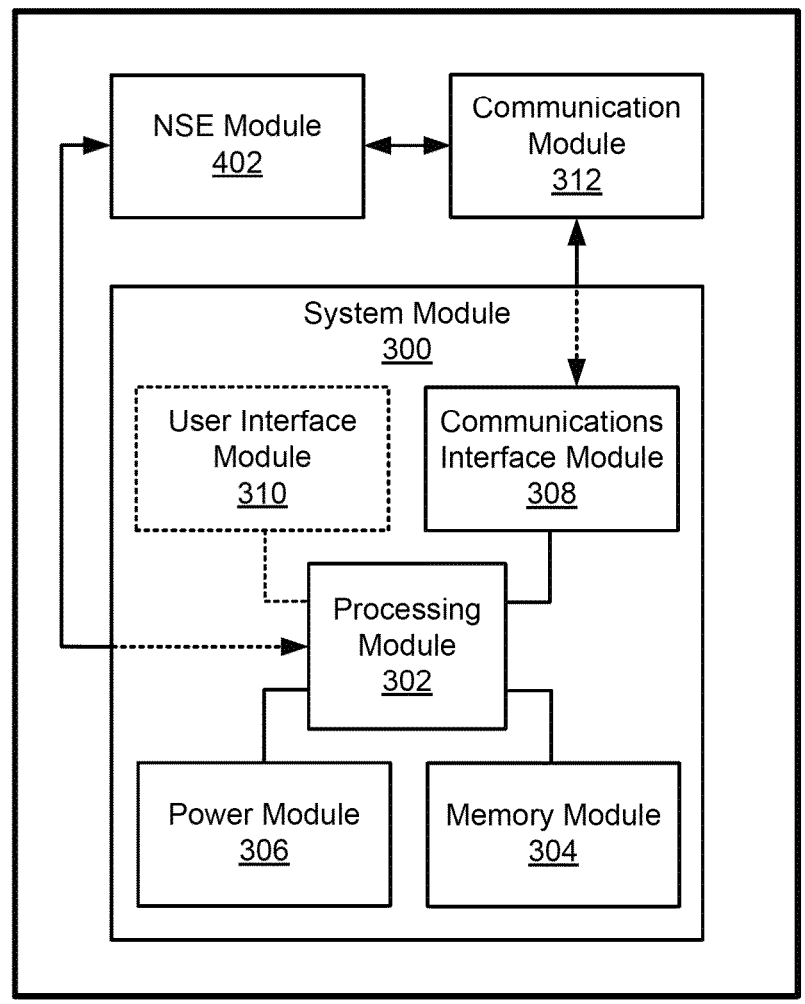
FIG. 4 is a is a block diagram illustrating an exemplary set of modules configured to be implemented in a device that an NSE may utilize to operate, in accordance with at least one embodiment of the present disclosure.

FIG. 4 shows a block module diagram of a device 400 that may be implemented to facilitate aspects of the NSE functionality disclosed herein. As illustrated, device 400 may include similar modules (sharing the same reference numbers) as those shown in controller 106' of FIG. 3 and discussed above. In addition, interface module 310 is depicted as being optional and an NSE module 402 is provided in place of NSE control module 314. User interface module 310 may be optional (or rudimentary) if, for example, device 400 is implemented as a (or as part of a) dedicated networking device such as a switch, router, bridge, gateway, etc. Generally, NSE module 402 may be configured to interact with at least one of processing module 302 and communication module 312 in device 400. For example, NSE module 402 may be used to transmit status information to controller 106 via communication module 312, and may receive control information from controller 106 via communication module 312. NSE module 302 may also be configured to interface with processing module 302 for various operations, such as control how processors/cores in processing module 302 process information flows between ports.

Figure 5:
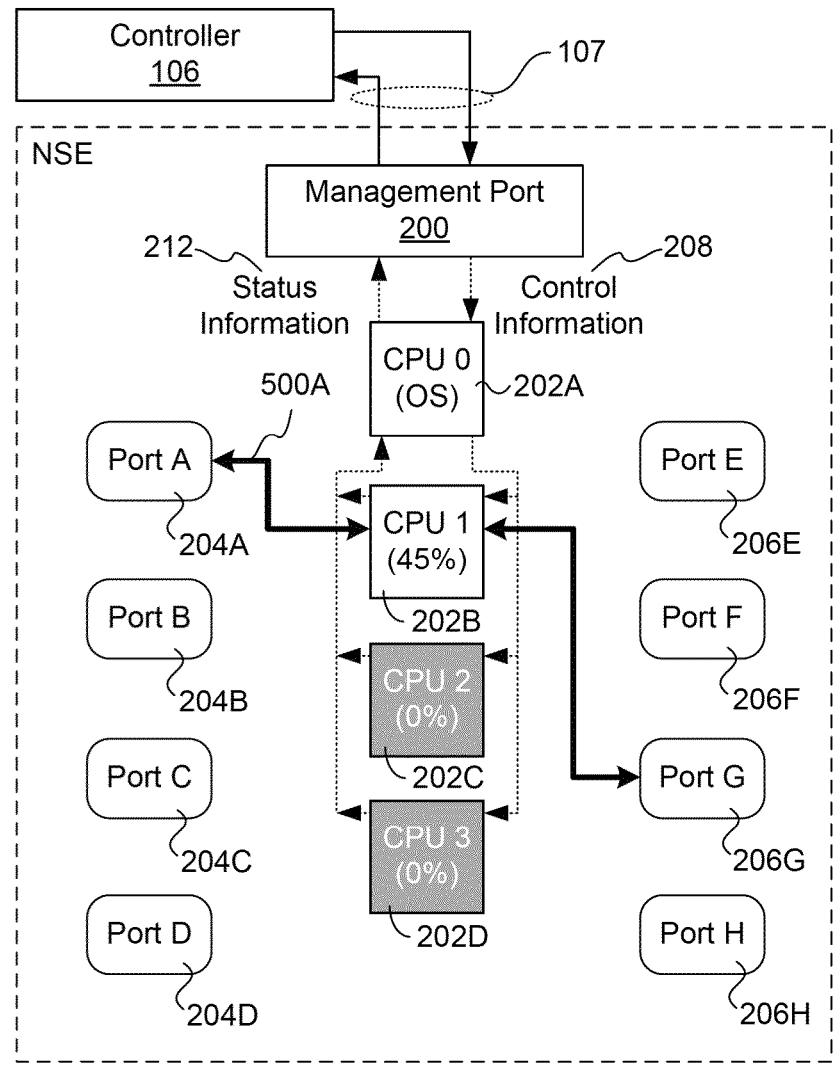
FIG. 5 illustrates an example of information flow assignment including a controller and network switching element in accordance with at least one embodiment of the present disclosure.

FIG. 5 illustrates an example of information flow assignment for an NSE 102' via controller 106. In the illustrated embodiment, NSE 102' includes eight network ports A-H also labeled as ports 204A-D (corresponding to ports 204 in FIG. 2) and ports 206E-H (corresponding to ports 206 in FIG. 2). NSE 102' also includes four processors 202A-D also labeled and referred to herein as CPU 0, CPU 1, CPU 2, and CPU 3, which correspond to processors 202 in FIG. 2. Although depicted as CPUs, corresponding functionality may be facilitated by processing cores in a multi-core processor (e.g., an SoC). In addition, CPUs 0-3 may represent virtual processing resources associated with one or more virtual machines running on underlying physical hardware for NSE 102'.

Processor 202A may be loaded with the NSE Operating System (OS) that configures processor 202A to, for example, receive status information 212 from processors 202B-D, provide status information 212 to controller 106 via management port 200, receive control information 208 from controller 106 via management port 200 and assign processors 202B-D to process information flows (such as depicted by an information flow 500A) between ports 204A-D and ports 206E-H in NSE 102' based on control information 208. For example, processor 202A may provide status information 212 to controller 106 indicating that NSE 102' has three available processors (e.g., processors 202B-D), a processor type (e.g., processing cores in an x86-based microprocessor), the current processing load of the available processors, etc. Controller 106 may utilize status information 212 in determining control information 208. For example, control 106 may instruct NSE 102' (via corresponding control information 212 received and processed by processor 202A) that the percent utilization level of processors 202B-D is limited to a minimum of 5% and a maximum of 80%. Software running on processor 202A, such as the NSE OS, may utilize the control information when assigning information flows to processors 202B-D such that each of the processors is operated within the specified utilization levels.

In the example illustrated in FIG. 5, processor 202A assigns processor 202B to process a first information flow 500A between network ports 204A and 206G. Processing first information flow 500A causes processor 202B to have a 45% utilization level, which complies with the example minimum and maximum percent utilization levels in control information 208. Processors 202C and 202D are inactive (e.g., 0% utilization level), and thus, have been deactivated as indicated by these processors being grayed-out. As a result, all active processors (e.g., processor 202B in FIG. 5) are in compliance, and processor 202A does not need to reassign and information flows.

Figure 6:
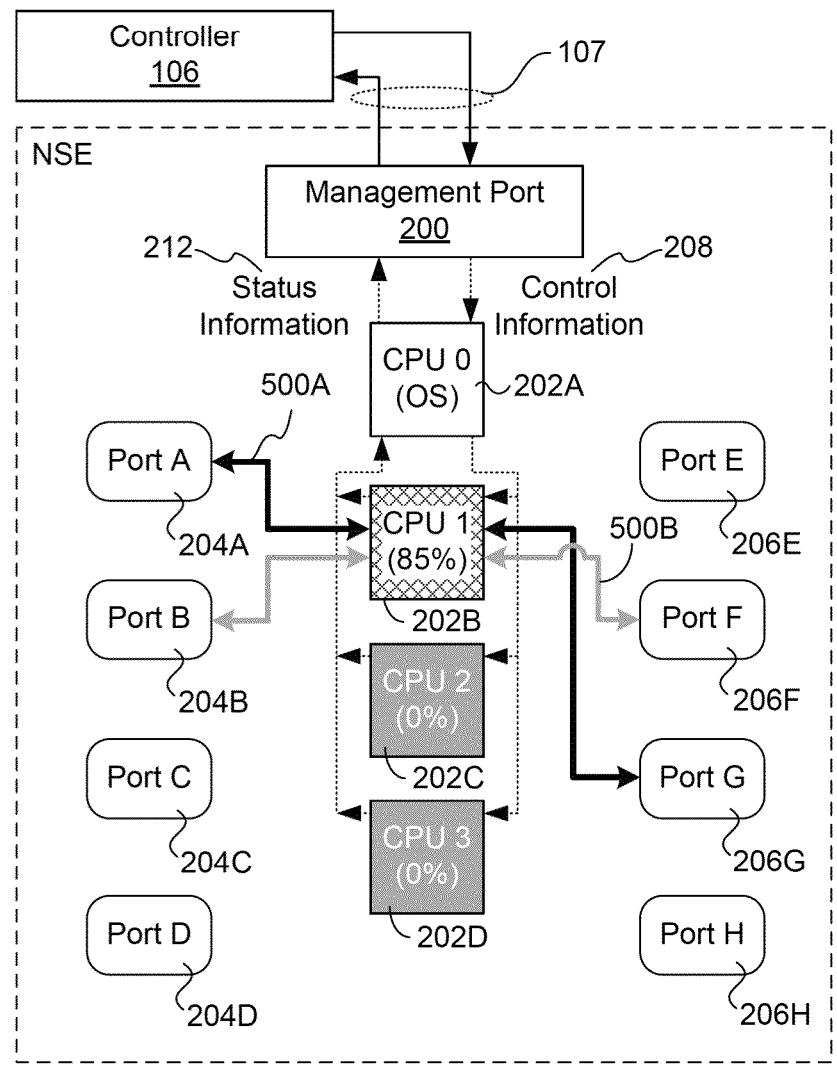
FIG. 6 illustrates an example of the operation of a processor in a network switching element not being in compliance with control information in accordance with at least one embodiment of the present disclosure.
Figure 7:
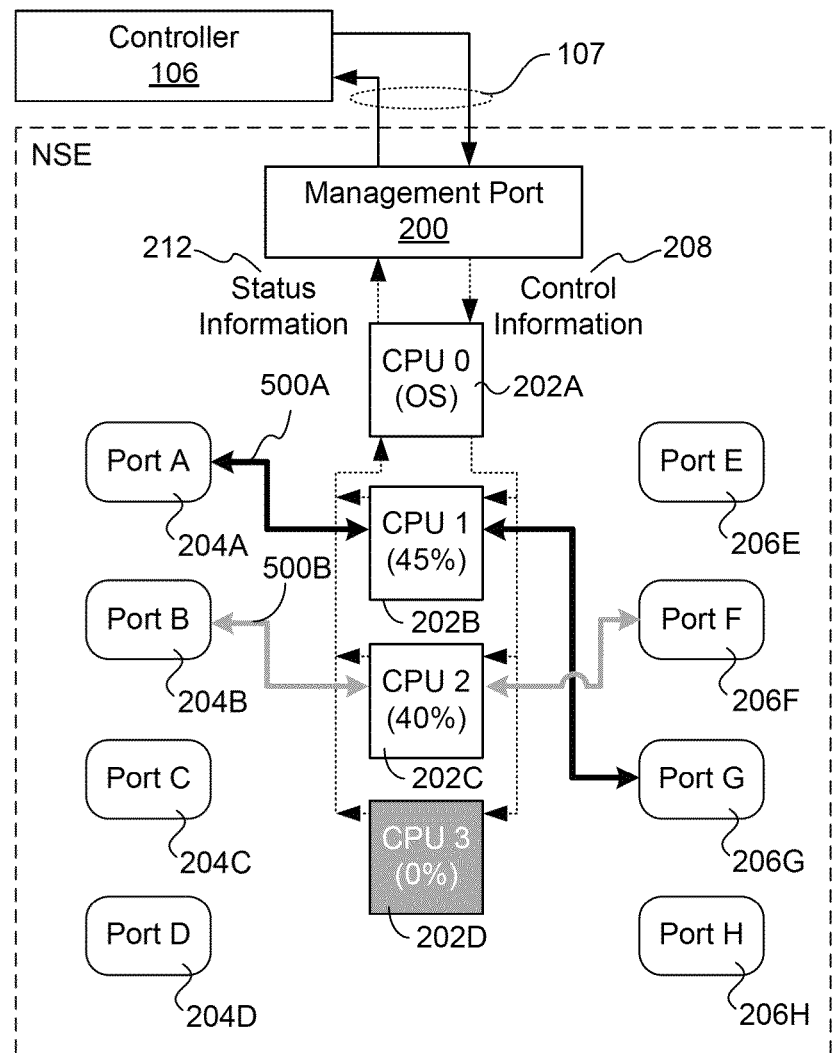
FIG. 7 illustrates an example of reassigning an information flow to bring the operation of a processor in a network switching into compliance with control information in accordance with at least one embodiment of the present disclosure.

FIG. 6 proceeds to build upon the example illustrated in FIG. 5 by introducing a second information flow 500B between ports 204B and 206F of NSE 102'. Second information flow 500B may, at least initially, be assigned to processor 202B (e.g., since it is actively processing first information flow 500A). Processor 202A may then become aware (e.g., based on status information 212 received from processor 202B) that the operation of processor 202B is not in compliance with the 80% maximum utilization level set forth in control information 208 because the percent utilization level of processor 202B has risen to 85%. To bring the operation of processor 202B back into compliance with control information 208, in FIG. 7 processor 202A may activate processor 202C and may then assign second information flow 500B to processor 202C. As a result of the reassignment, the percent utilization of processor 202B may drop back down to 45% and the percent utilization of processor 202C may rise to 45%, allowing the operation of both processors 202B and 202C to be in compliance with control information 208.

Figure 8:
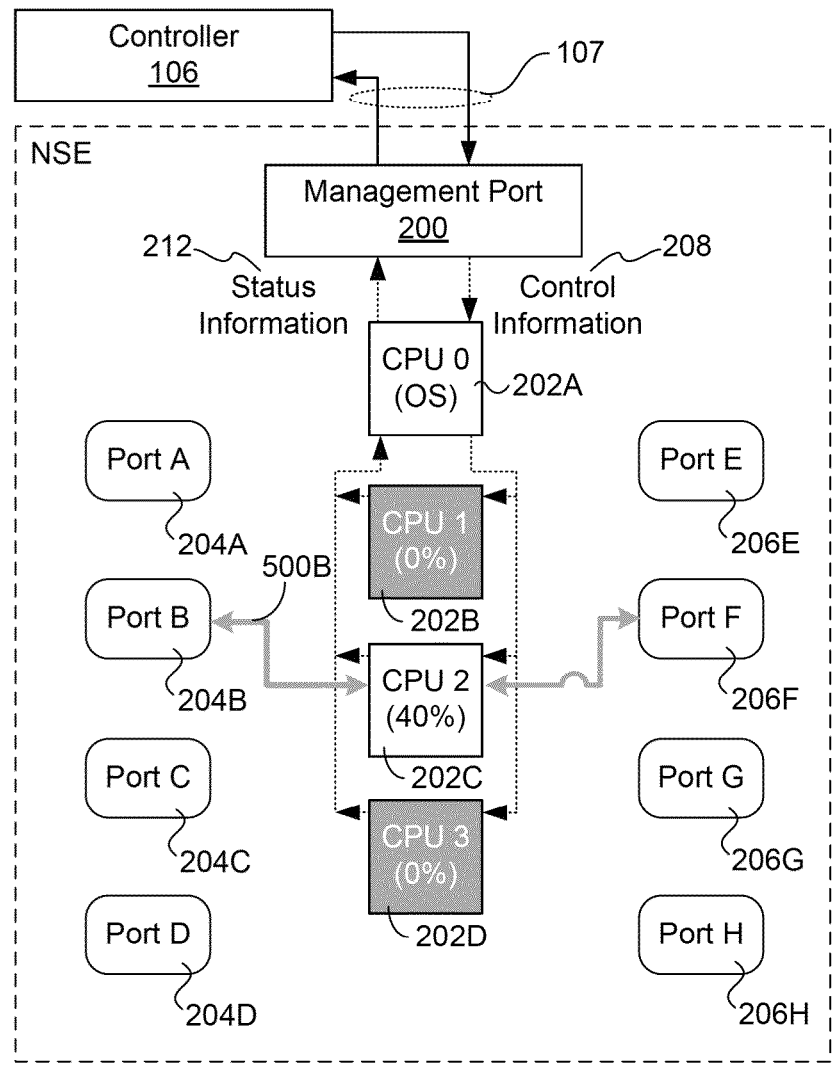
FIG. 8 illustrates an example of disabling inactive processors in a network switching element in accordance with at least one embodiment of the present disclosure.

In FIG. 8, first information flow 500A is discontinued (e.g., due to completion, being cut off, etc.). In one embodiment, if processor 202B was still actively processing other information flows, but the percent utilization level of processor 202B was below the minimum set forth in control information 208 (e.g., <5%), then processor 202A may reassign the other information flows to another active processor with capacity such as, for example, processor 202C. Once processor 202B becomes totally inactive, processor 202A may deactivate processor 202B to, for example, conserve energy, free up processor 202A to perform other tasks, etc. While not shown in FIGS. 5-8, situations may occur where the operation of one or more processors 202B-D are not in compliance with control information 208, but none of processors 202B-D have any available processing capacity to balance out the processing load. In one embodiment, this situation may cause processor 202A to alert controller 106 (e.g., via management port 200). Controller 106 may then attempt to direct information flows away from NSE 102' (e.g., to another NSE) to reduce the processing load for NSE 102', which may allow processor 202A to reassign one or more information flows and bring the operation of processors 202B-D into compliance.

Spanning Tree Routing Using Flow Control Switches

In one embodiment, aspects of a Spanning Tree Protocol (STP) are employed for facilitating information assignments to NSEs and their resources. STP is a network protocol that ensures a loop-free topology for any bridged Ethernet Local Area Network (LAN). Under its original conventional usage, STP was implemented to prevent bridge loops while concurrently ensuring all LAN or network segments remain accessible via any node in the network. STP also allows a network design to include spare (redundant) links to provide automatic backup paths if an active link fails, without the problem of bridge loops, or the need for manual enabling/disabling of these backup links. The standard implementation of STP is defined in the IEEE standard 802.1D-2004. Selected aspects of the standard implementation are presented herein for clarity and brevity.

Figure 9:
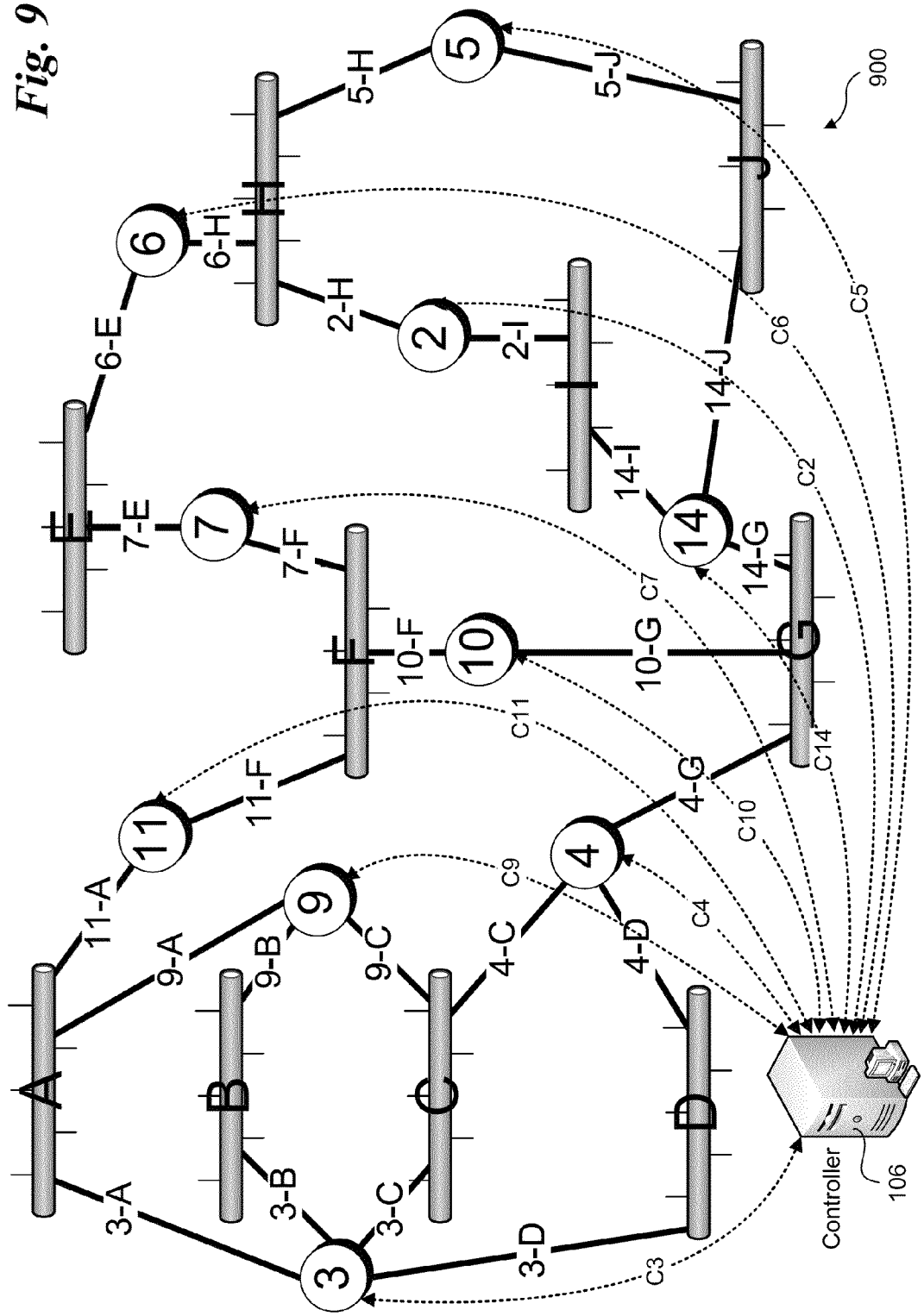
FIG. 9 illustrates a network comprising a plurality of Ethernet segments coupled via bridge nodes used for illustrating derivation of a spanning tree using the Spanning Tree Protocol standard.

To visualize operation of STP, the network topology is depicted as a graph whose nodes are bridges that are coupled to LAN segments using network links having corresponding interfaces (i.e., ports) at each connection. An exemplary graph and corresponding network topology for a network 900 is depicted in FIG. 9. Network 900 includes multiple network segments labeled A-J interconnected via network bridges labeled 2-7, 9-11, and 14 and corresponding network links coupled between the network segments and bridges. For convenience and clarity, each network link is labeled as N-A, where N is the bridge number and A is the network segment. For example, the network links coupling bridge 3 in communication with network segments A, B, C, and D are labeled, 3-A, 3-B, 3-C, and 3-D, respectively. In addition the bridge ID's for the following discussion are simply the node number for each bridge node, and the terms bridge and node may be used interchangeable in the following description. Moreover, although referred to as bridges under standard STP terminology, the bridges may generally represent an NSE. In some embodiments, the NSEs are configured similar to NSE 102 and/or NSE 102' described herein.

In addition to the various network segments and network links, each of nodes 2-7, 9-11, and 14 is communicatively coupled to a controller 106 via a corresponding secure channel link 107, in a manner similar to that shown in FIG. 1 and described above. As before, each of links 107 is labeled CN, wherein N corresponds to the node number Under the conventional STP algorithm, to break loops in the LAN while maintaining access to all LAN segments, the bridges collectively compute a spanning tree. The spanning tree that the bridges compute using the Spanning Tree Protocol can be determined using the following rules and operations defined in IEEE standard 802.1D-2004. Embodiments herein implement an augmented approach under which a similar spanning tree is computed, but rather than having this performed by the bridges/nodes, the calculation of the spanning tree is performed by controller 106, alone or in combination with operations performed by the bridges/nodes.

The first operation for computing a spanning tree is to select a root bridge of the spanning tree. Under the standard STP approach, the root bridge of the spanning tree is the bridge with the smallest (lowest) bridge ID. Each bridge has a unique identifier (ID) and a configurable priority number; the bridge ID contains both numbers, wherein the priority number is used to determine the smallest bridge ID, and the unique ID is used for a tie-breaker in situations where two or more bridges share the same priority number. For example, to compare two bridge IDs, the priority is compared first. If two bridges have equal priority, then the MAC addresses, which are guaranteed to be unique (and thus employed as the unique IDs), are compared, with the lower MAC address breaking the tie. Since a priority for each bridge is configurable, a network administrator can select which bridge is to be the root bridge by setting that bridge to have a lower priority number than all of the other bridges. Since controller 106 is employed for computing the spanning tree, it can be used to select the root bridge rather than using the conventional approach. In this instance, any of the nodes 2-7, 9-11, and 14 may be selected as the root bridge. However, for this example, the root bridge (i.e., root node) will be selected as node 2.

Under the standard STP approach, each bridge node sends out a hello message along each of its links to its neighboring nodes, enabling the neighboring nodes to exchange configuration information. Under STP, the hello messages comprise special data frames called Bridge Protocol Data Units (BPDUs) that are used to exchange information about the bridge IDs and root path costs. A bridge sends a BPDU frame using the unique MAC address of the port itself as a source address, and a destination address of the STP multicast address 01:80:C2:00:00:00. In general, BPDU frames are exchanged during several cycles to determine the network topology, identify the root bridge, and to calculate Root Path Costs. The BPDU frame contains a tuple comprising a Root Bridge ID, Root Path Cost, and the Sending node's Bridge ID. The Root Bridge ID is the bridge node ID corresponding to the ID of the node the sending bridge node thinks is the correct Root Bridge for the current message exchange cycle, which is referred to herein as the candidate Root Bridge, since the correct Root Bridge would not be known to all bridges at this stage. The Root Path Cost is the projected cost of sending a packet along a path from the Sender to the candidate Root Bridge. For the following example shown in FIGS. 9a-9c, the cost from traversal of a given bridge node to a neighbor node is '1', while the cost for traversing a link or crossing a bridge is '0'. As described below, under the STP-based NSE information flow assignment scheme, the cost of each link traversal is determined as a weighted function determined from status information generated by each node (i.e., NSE) In addition to being assigned, costs for links, bridges, and network segments may be dynamically determined, e.g., by measuring link traffic and related parameters during network operation.

In contrast to the conventional STP approach, embodiments herein may be implemented without the use of BPDU hello messages. For example, since controller 106 is aware of the network topology, is able to define the root bridge (node), and either determines link path costs based on the NSE status information (e.g., status information 212) or receives link path costs that are calculated by the NSEs, the controller has access to all of the information necessary to calculate a spanning tree. Accordingly, the spanning tree is computed using a scheme similar to the standard STP algorithm, but without the need using BPDU hello messages for network topology discovery and Root Path Costs.

The next phase in the process is to determine the root port (RP) for each bridge. The RP for a given bridge corresponds to the port on a bridge via which information flows may be sent to the root bridge employing the least cost path (LCP). Under the standard STP approach, LCPs and RPs are determined by the bridges themselves. However, under the controller approach, LCPs and RPs may be determined by controller 106.

Figure 9A:
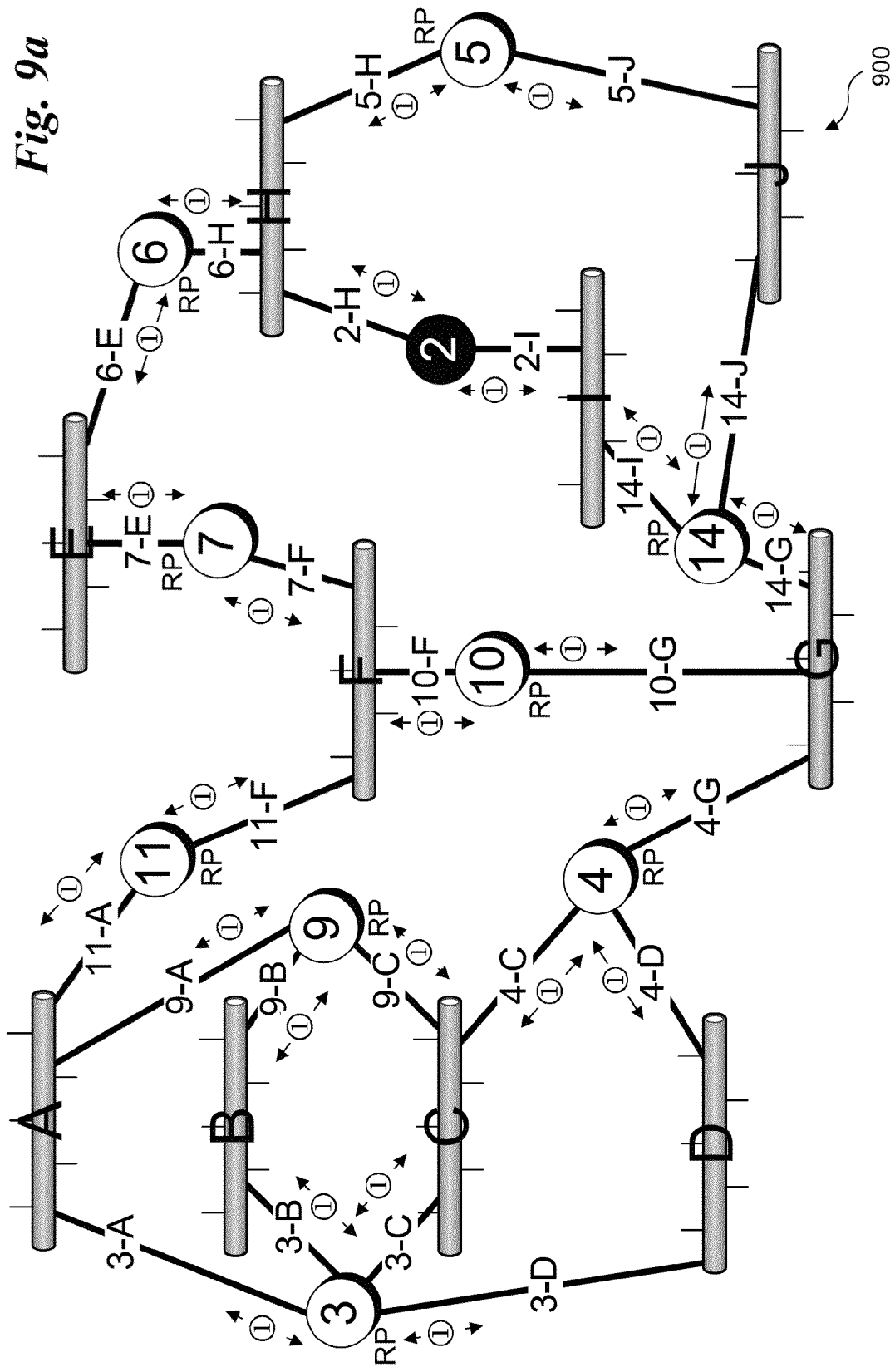
FIGS. 9a-9d illustrate a sequence for deriving a spanning tree for the network of FIG. 9 using the Spanning Tree Protocol.
Figure 9B:
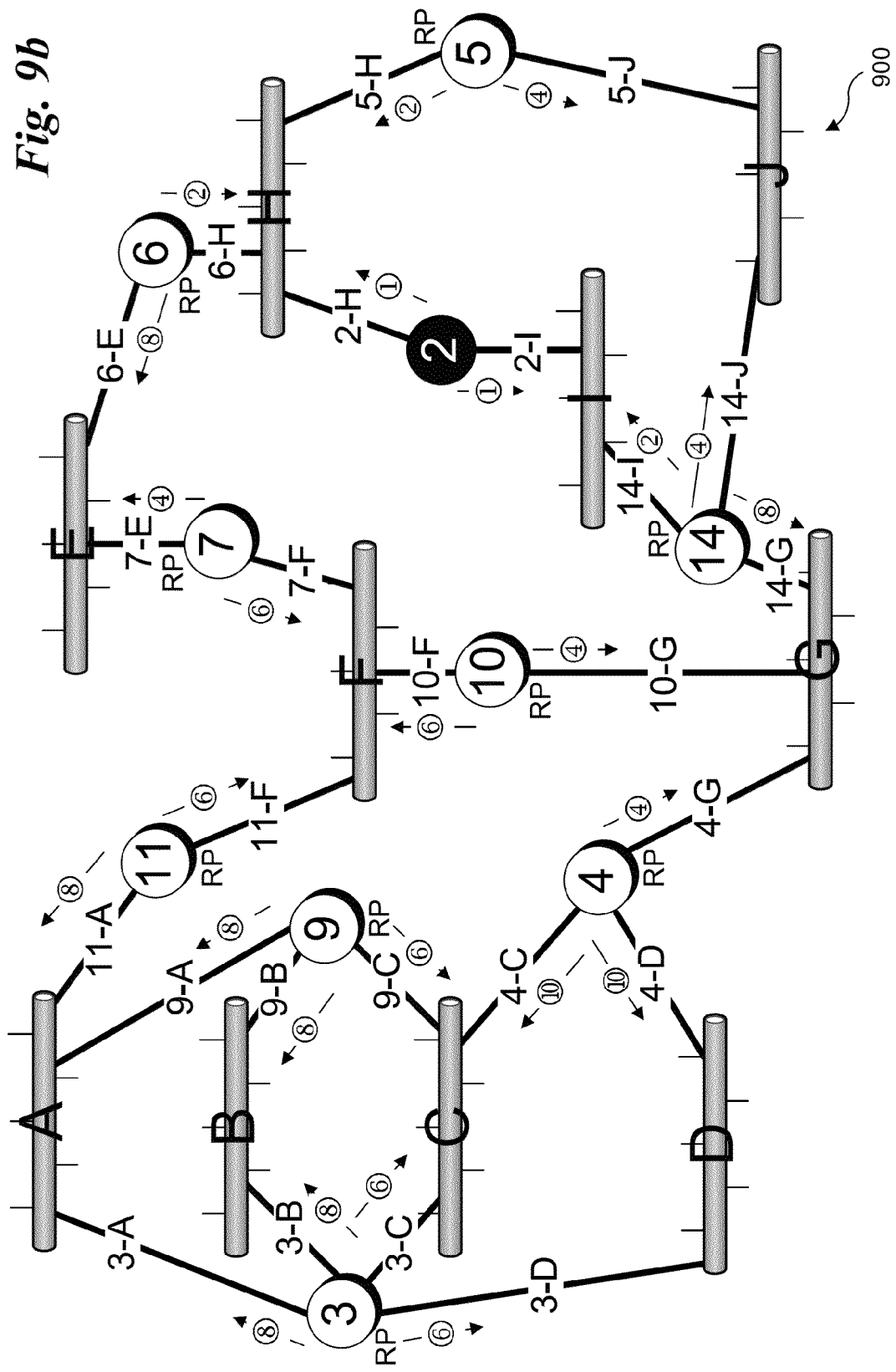

With reference to FIGS. 9a and 9b, identification of root ports are determined as follows. As shown in FIG. 9a, a link traversal cost of '1' has been assigned to each link (as depicted by the double-headed arrows with an encircle '1'), with the cost associated with crossing each network segment set to '0' (not shown) for point of illustration. (In the Figures herein, bridge ports are depicted by the junction between a network link and a node circle.) The LCP for a given bridge port is determined by adding up all of the costs for the links and network segments that are traversed to reach the root bridge using a least cost path routing approach (the routing from a given port is selected such that a least cost path is obtained). The results of the LCPs for various bridges and ports in shown in FIG. 9b as an arrow having an encircle number indicating the LCP corresponding to the port the arrow is pointing away from. For example, for bridge 4, the LCPs are 4 using the port connected to link 4-G, 10 using the port connected to link 4-C, and 10 using the port connect to link 4-D. Since the root port is the port via which the LCP is routed, the port located at the junction between the node circle for bridge 4 and link 4-G is marked "RP." RP's for the other bridges are determined in a similar manner and marked accordingly in FIG. 9b.

Figure 9C:
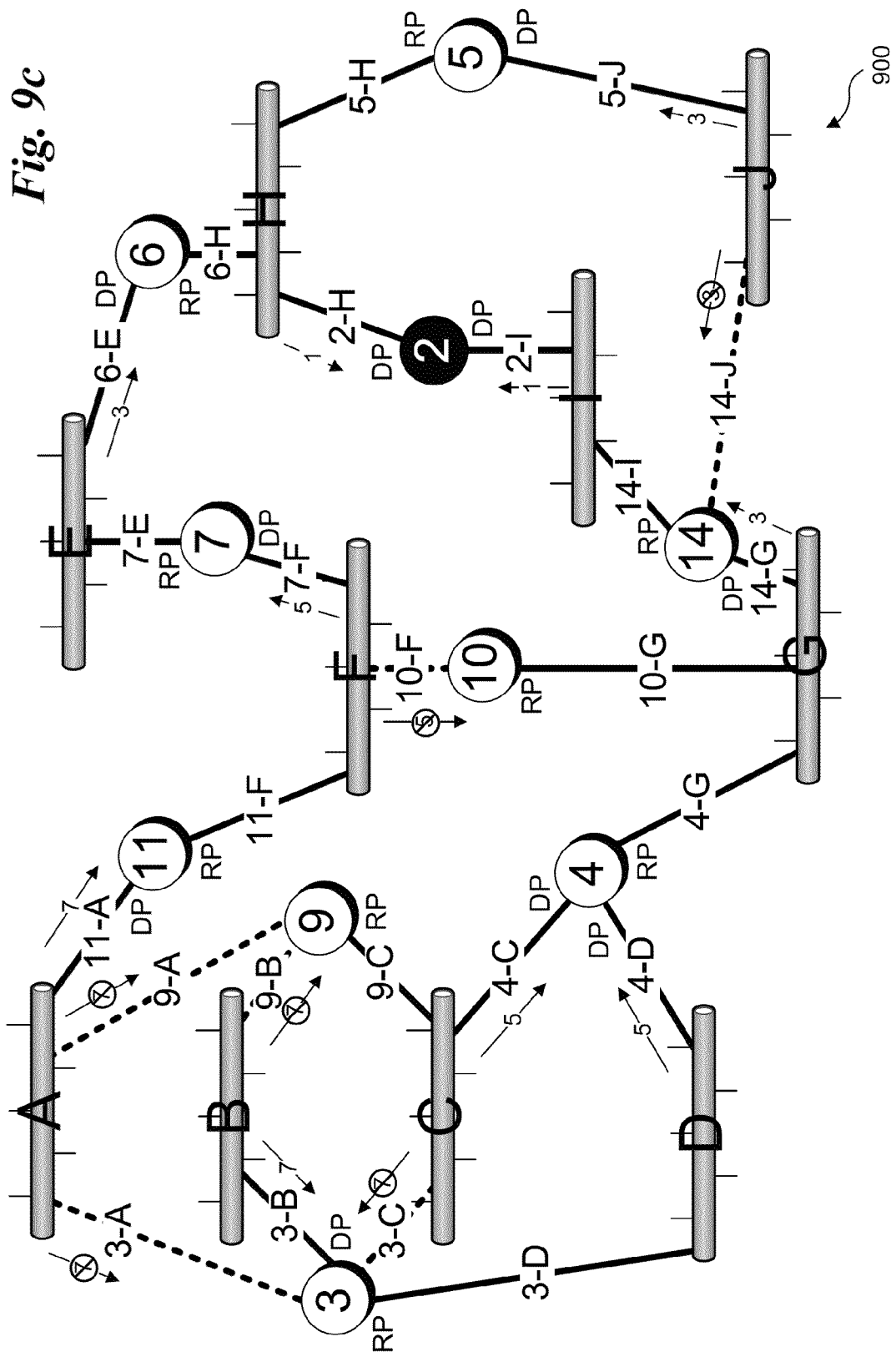

A similar operation is performed for the network segments, under which the least cost path from each network segment to the Root Bridge is determined. For a given network segment, the bridges linked to the segment determine which bridge has the least cost path to the Root Bridge. The bridge port at which the segment is connected to the bridge having the least cost path is then referred to as the designated port (DP). The DP's and root path costs for each route from the network segments are depicted in FIG. 9c.

At this point the RP's and DP's for the network bridges are identified. In accordance with some embodiments employing STP, the bridge ports that are neither a root port nor a designated port become candidates for disabling such that information flows are not routed via such ports. These ports are identified in FIG. 9c by arrows having worth root path cost numbers with circles having a slash through them, wherein the arrow points to the port being a candidate for disabling. The dashed lines used for links in FIG. 9c depict links that are coupled to ports considered for disabling. It is noted that in some cases in this simple example with all link costs of '1' there are ties for least cost paths to the root bride node 2. In the case of ties, one of the two links from a given node or network segment with a tie has been selected.

Figure 9D:
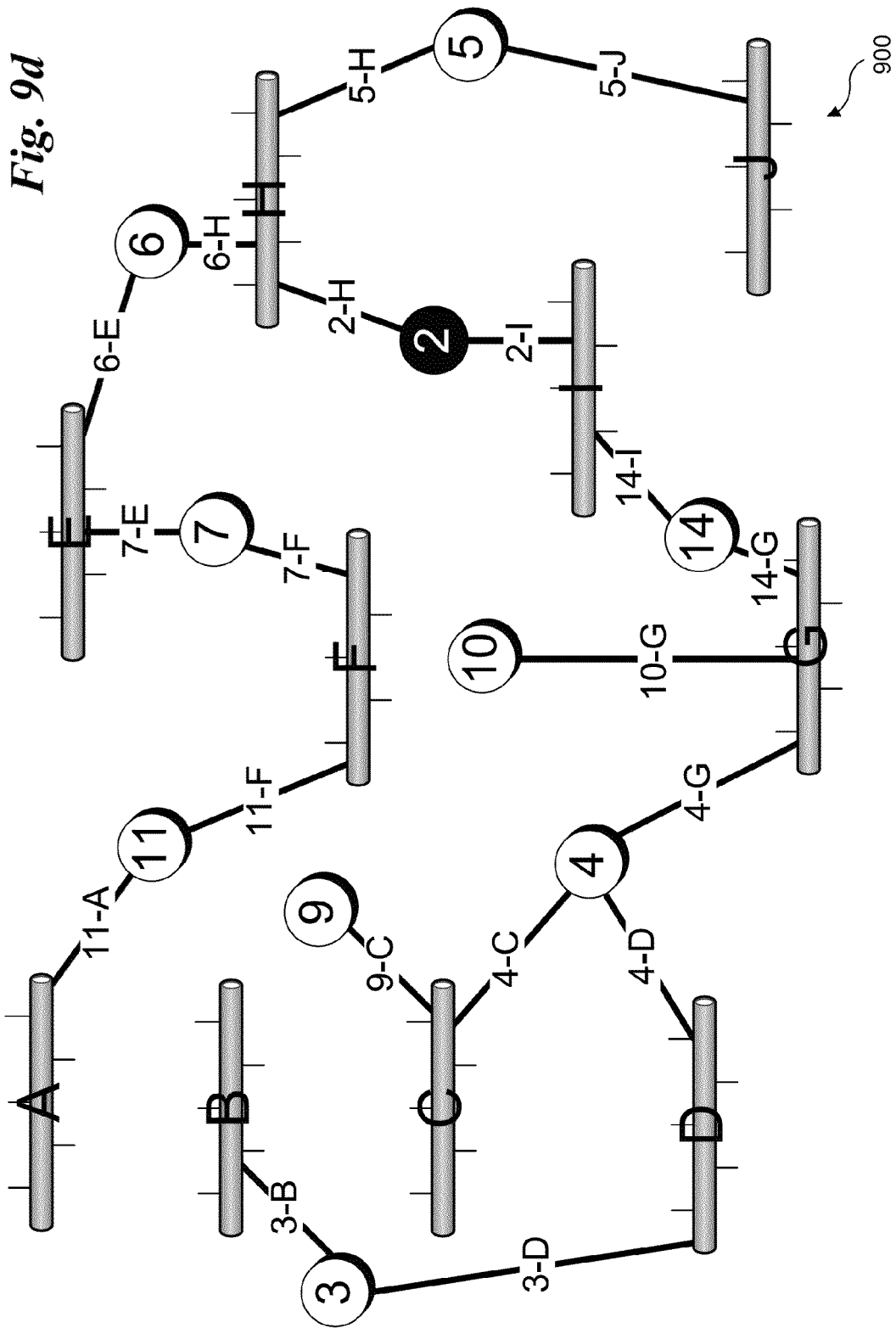
Figure 9E:
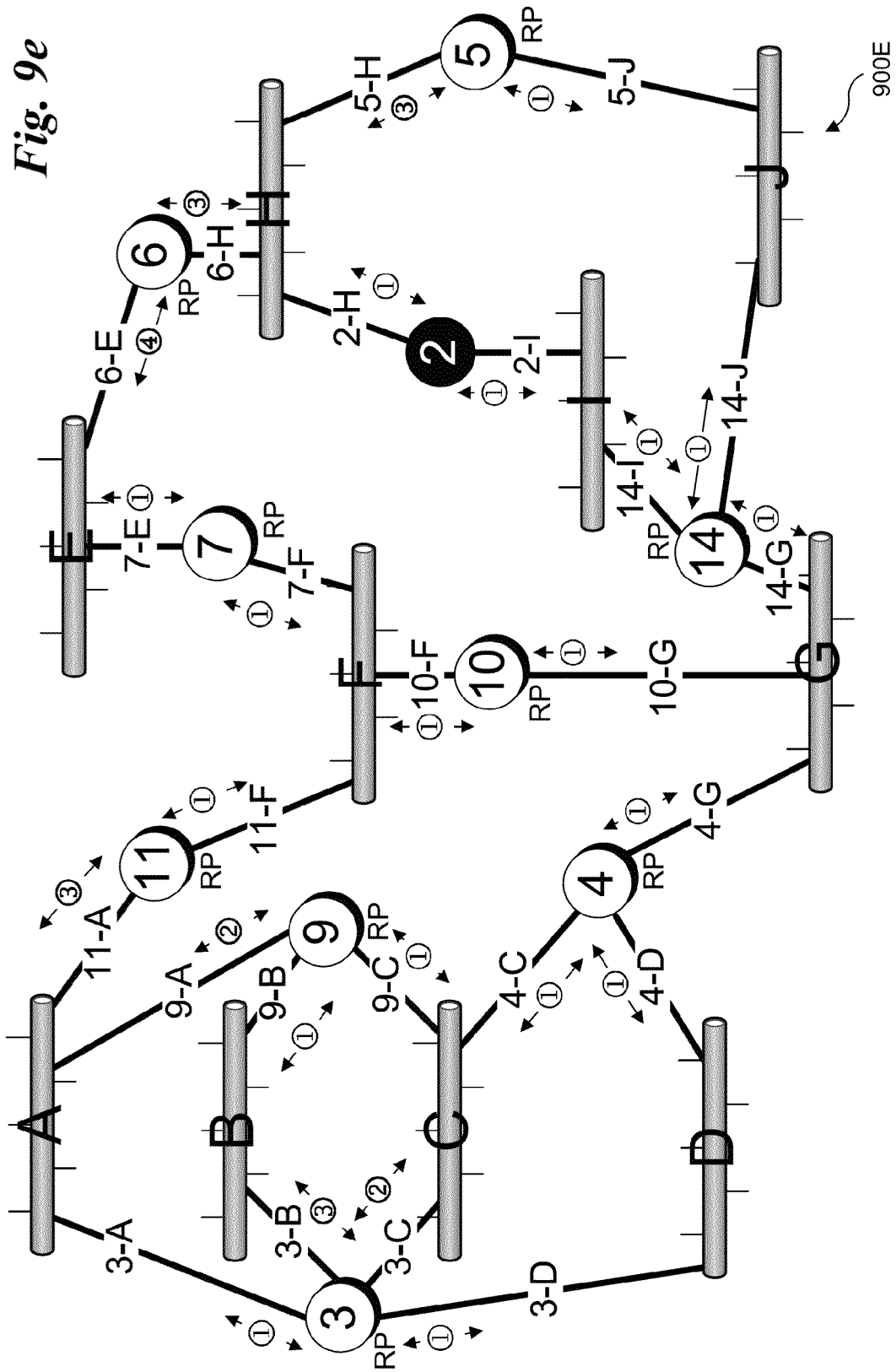
FIGS. 9e and 9f illustrate a change to the spanning tree resulting from changes in link costs for some of the links in the network of FIG. 9.
Figure 9F:
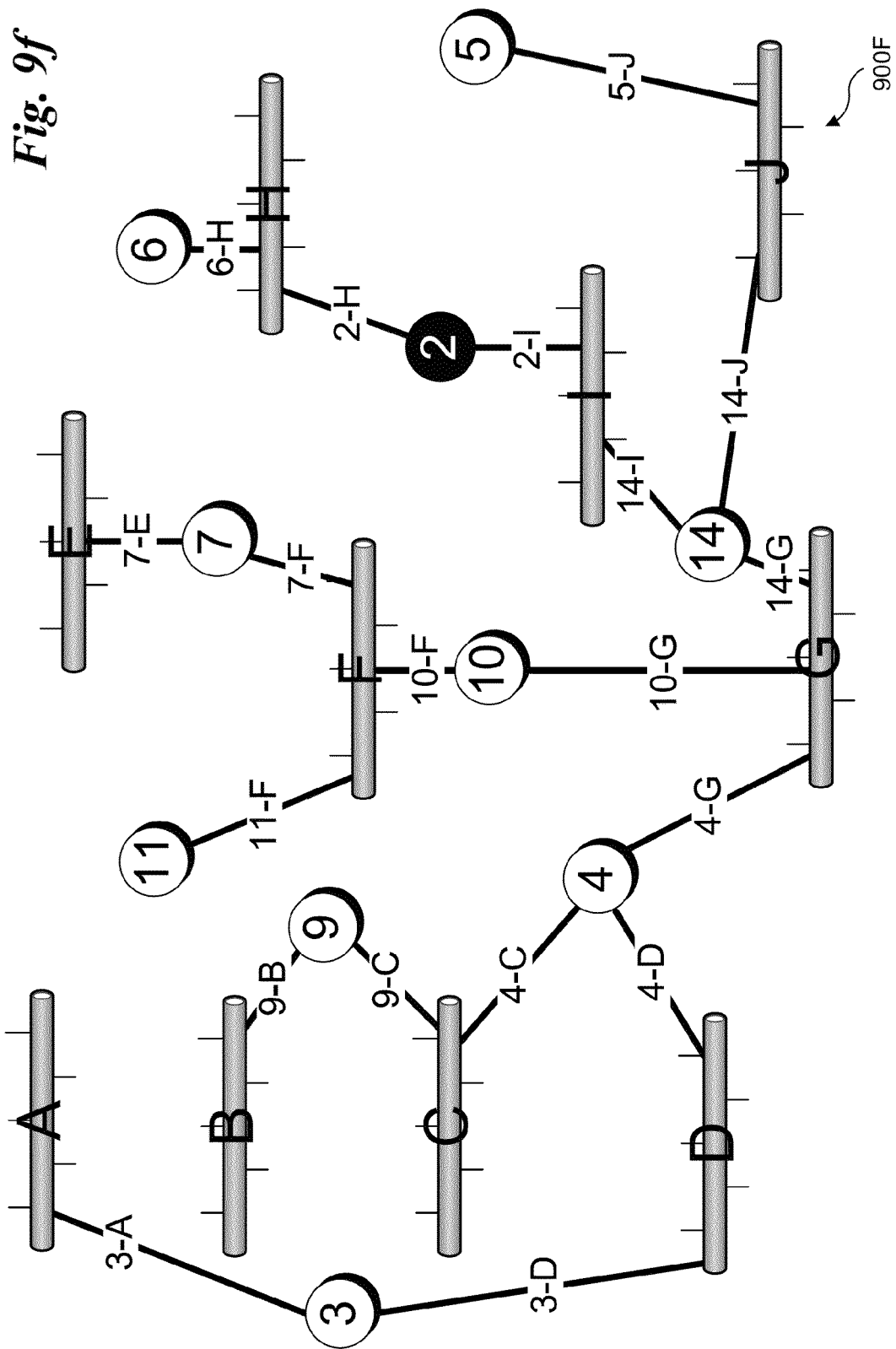

The resulting spanning tree 900D is shown in FIG. 9d. Notably, several links have been removed from the full routing tree shown in FIG. 9a, including links 3-A, 3-C, 9-A, 9-B, 10-F, and 14-J. As with the original motivation for developing STP, there are no path loops in spanning tree 900D.

In accordance with further aspects of some embodiments, spanning trees for a network of nodes comprising flow controlled NSE's are dynamically computed and reconfigured, as applicable, during ongoing operations based, at least in part, on status information generated by the NSEs. In view of changes in the spanning tree, information flows are re-assigned and/or otherwise caused to be rerouted such that ports that are candidates for deactivation (based on the updated spanning tree configuration) are not used. In addition, ports that were deactivated or otherwise not being used for flows under a given spanning tree configuration may be reactivated for re-assignment of existing flows and/or new flow assignments when those ports are correspond to a root port or designated port in the updated spanning tree.

Figure 10:
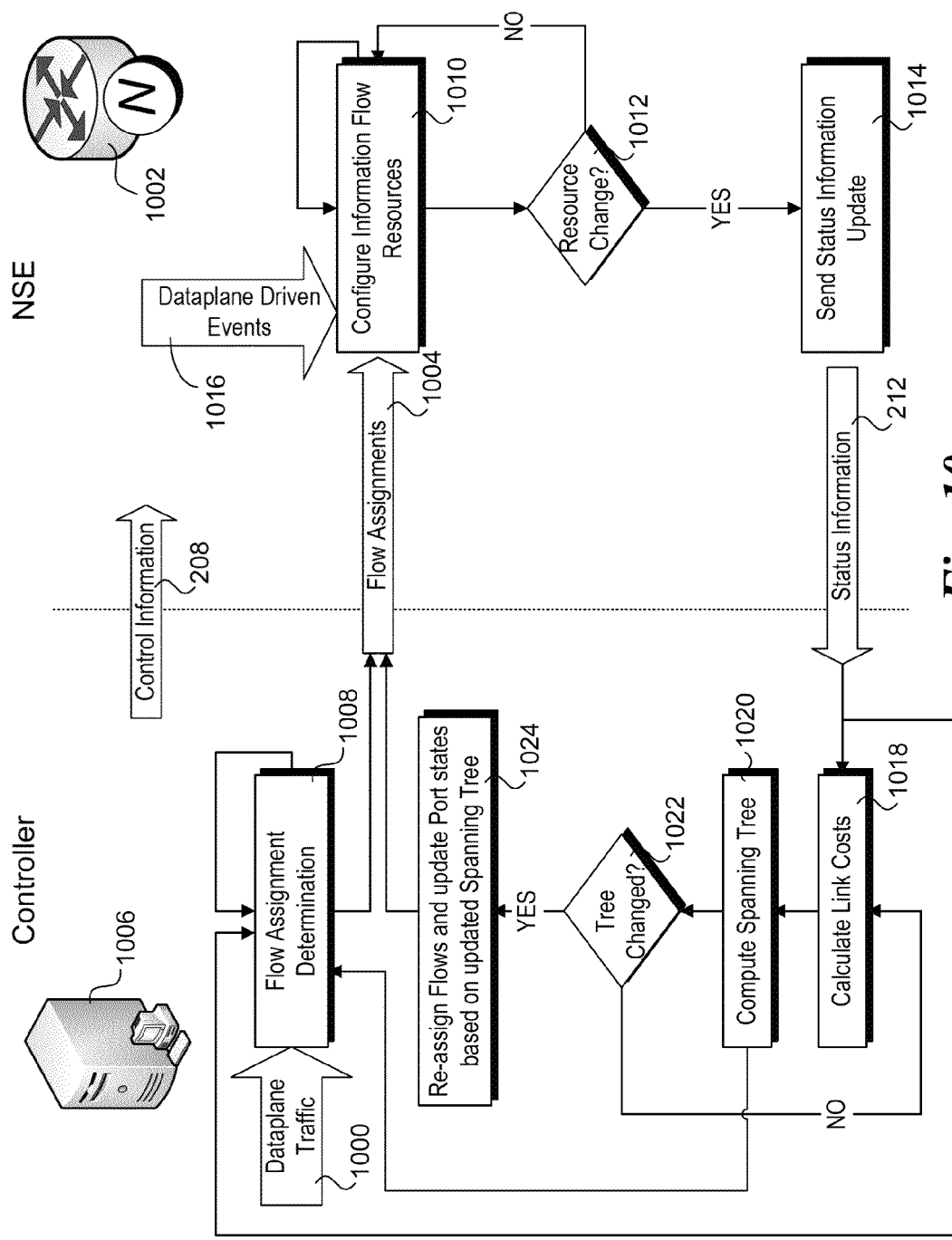
FIG. 10 shows a combined message flow and flowchart illustrating operations and logic implemented by a controller and an NSE for facilitating flow assignments, re-assignments, and related operations for a network employing spanning tree-based routing, according to one embodiment.

FIG. 10 shows a combined message flow and flowchart illustrating operations and logic implemented by a controller and an NSE for facilitating flow assignments, re-assignments, and related operations for a network employing spanning tree-based routing, according to one embodiment. In FIG. 10, the operations depicted on the left side of the diagram are performed by a controller 1006, having a configuration and functionality similar to that of controller 106 and 106'. The operations depicted on the right side of the diagram are performed by an NSE 1002, having a configuration and functionality similar to NSE 102 and 102'. In various embodiments, some of the operations performed by the controller and NSE may be performed in an ongoing, generally asynchronous manner, while other operations are coordinated between the controller and NSE. In addition, similar operations to those depicted for NSE 1002 are being performed by other NSEs in the network.

During ongoing operations, various dataplane traffic 1000 may be introduced into the network be various devices coupled to the network nodes, such as the computing devices shown in FIG. 1 (e.g., desktop computers, servers, laptops, notebooks, mobile devices, etc.). In response to dataplane traffic 1000 and in consideration of status information 212 generated by NSE 1002 and the other NSEs, controller 1006 sends control information 208 including flow assignments 1004 to NSE 1002 and the other NSEs, as depicted in a block 1008. Information corresponding to flow assignments 1004 is received by an applicable NSE (through which a corresponding information flow is to be configured), and the NSE configures its resources to support the information flow, as shown in a block 1010.

As discussed above, under OpenFlow NSEs may be configured to allocate resources for assigned information flows in a manner independent of a controller. As a result, during ongoing operations, NSE 102 will receive various flow assignments 1004, including flow assignment information identifying new flows to be added and existing flows to be dropped. In general, an initial allocation of resources for each new flow will be determined by the NSE in view of existing resource allocations and applicable criteria, such as the processor utilization percentage. This may cause a change in resource allocations that is significant enough to warrant generation and sending of updated status information 212 to controller 106, as depicted by a decision block 1012 and a block 1014.

In addition to reconfiguration of resources based on flow assignments 1004, resources may be reconfigured based on dataplane driven events 1016. For example, while a given flow assignment may route traffic from an input network port A to an output network port B, the flow assignment doesn't specifying how a change in traffic load for the information flow is to be handled. If the flow increases enough, additional processing and memory buffer resources may be added to handing the increased traffic. Similarly, if the workload for an information flow is observed to substantially decrease, the processor allocated for the workload may be reassigned based on various criteria. For example, under an embodiment emphasizing reduced power, the workload for a processor assigned to an information flow may fall below a threshold while another active processor has sufficient unused utilization to be reassigned to handle the information flow. Accordingly, after the reallocation of the processor resources, the processor initially handling the information flow may be powered down to operate in a reduced power state or sleep state.

In general the result of various flow assignments 1004 and dataplane driven events 1016 will result in various resource changes that, if significant enough (as determined by logic corresponding to decision block 1012), will cause updated status information 212 to be generated an sent to controller 1006. In addition to receiving status information 212 from NSE 1002, similar status information will be generated by other NSEs and sent to controller 1006. In general, the generation of sending of status information 212 may be asynchronous in nature, with corresponding status information updates being received by controller 1006 as the status information updates are sent. In some embodiments, status information may be sent periodically using a predefined schedule or the like.

As illustrated, status information 212 is received by each of blocks 1008 and 1018. The status information may be employed by block 1008 for determining flow assignments. For example, in some embodiments controller 1006 maintains a global view of the information flows, along with adequate status information to determine NSE resources allocated to the flows, at least to some degree. In addition, logic in block 1008 may maintain spanning tree routing information, which is computed in a block 1020, as described below. In some implementations it may be desirable to assign new flows such that an existing spanning tree is projected to not result in a reconfiguration in response to changes in NSE resource allocations to support the new flows. Accordingly, new flows may be determined in block 1008 as a function of NSE status information in combination with spanning tree routing information. In other implementations, the use of spanning tree routing information may not be implemented by block 1008.

Block 1018 is employed for (re-)calculating link costs, which are employed by block 1020 in computing the spanning tree. In some embodiments the link costs are derived as a function of weighted resource-related parameters, for which corresponding parameter values are either received via status information 212 or derived therefrom. For example, exemplary link cost parameters are depicted in FIGS. 11a and 11b, wherein there is a row of parameters for each link in network 900. The parameters are listed by respective column headings and include parameters related to processors, flows, frames per second, drop rate, bandwidth % (e.g., utilization or margin), and ports. This list is merely exemplary and is not to be limiting, as link costs may be determined base on other parameters that are not shown. Each parameter is multiplied by a weighting factor, as depicted by weighting factors W1-W6. The weighting factors may be adjusted for various purposes, such as QoS considerations (e.g., minimization of dropped packets), power considerations, reliability considerations, etc.

In addition to the scheme illustrated in FIGS. 11a and 11b, link costs may be determined via other techniques. For example, under one embodiment there may be multiple link cost calculations for a given link that are averaged to derive the link cost, such as a cost that is calculated for each flow traversing a given link. Simpler schemes may be employed, such as costs based on link utilization and/or link bandwidth margin.

Examples of processor-related information may include parameters such as number of processors, processor cores, or virtual processors, aggregated processing capabilities, individual and/or aggregated processor utilization, etc. Examples of parameters relating to flows may include number of flows being routed over a link, number of flows being handled by one or both nodes connected via the link, total bandwidth consumed by flows routed over a link, etc. Parameters relating to frames per second and drop rates may again apply to the link itself and/or relate to FPS and drop rates for nodes connected via the link. Parameters relating to bandwidth % might include % of link bandwidth consumed or available bandwidth margin. Parameters relating to ports may include the number of ports supporting a physical or logical link between nodes (such as under situations where redundant links are employed), number of ports on the NSEs coupling the nodes, number of unused ports, etc.

The spanning tree for the network is computed in block 1020. Depending on the implementation, re-computation of the spanning tree may be performed in response to updated link cost information, periodically using a schedule, or a combination of the two. In networks having a configuration similar to network 900, the spanning tree is determined in the manner discussed above. Spanning trees may also be determined for other network configurations, such as network 100, as discussed below.

In a decision block 1022, a determination is made to whether the configuration of the Spanning Tree has changed from its previous configuration. If not, the answer to decision block 1022 is NO, and the logic loops back to block 1018. If the Spanning Tree configuration has changed, the logic flows to a block 1024 in which flows may be re-assigned and port states updated based on the new Spanning Tree configuration. The re-assigned flows and port states are then provided as part of control information 208 and/or flow assignments 1004.

With reference to FIGS. 9a-f and FIGS. 11a and 11b, a dynamic reconfiguration of a Spanning Tree for network 900 proceeds as follows. In one embodiment, the initial cost for each link in a network such as network 900 is set to a predetermined value, such as 1, 10, 100, etc. The predetermined value selected may typically correspond to the link cost calculation using parameters based on a default or set of default NSE configurations and associated weighting factors. For convenience and point of illustration, simple integers are used in the examples herein, noting that actual implementation will typically involve larger and/or more varied link cost values. As discussed above, using a link cost of '1' for each link in network 900 (as shown in the link cost table in FIG. 11a) results in the Spanning Tree 900D shown in FIG. 9d.

During ongoing operations, status information from the NSEs will change in response to new information flows, the completion of existing flows, and various dataplane driven events. Changes in the NSE status information will, in turn, cause a change in the link costs calculated by the controller. For example, as shown in the link cost table of FIG. 11b and bolded link costs depicted for a network 900E in FIG. 9e, link cost changes have been made to links 3-B, 3-C, 5-H, 6-E, 6-H, 9-A and 11-A. This results in a Spanning Tree 900F shown in FIG. 9f. As before, the spanning tree does not include any loops, and is made up of the least link cost routing paths from each node to the root node (i.e., node 2).

Depending on the particular network link configuration and current link costs, the resulting changes in link costs may or may not result in changes to the spanning tree. Also, as discussed above, it may be advantageous to reduce the frequency of computing the spanning tree (or otherwise delaying application of updated configurations of spanning trees) such that the network configuration and associated NSE resources are not being changed so rapidly that addition overhead and/or reduced network performance results.

Figure 1A:
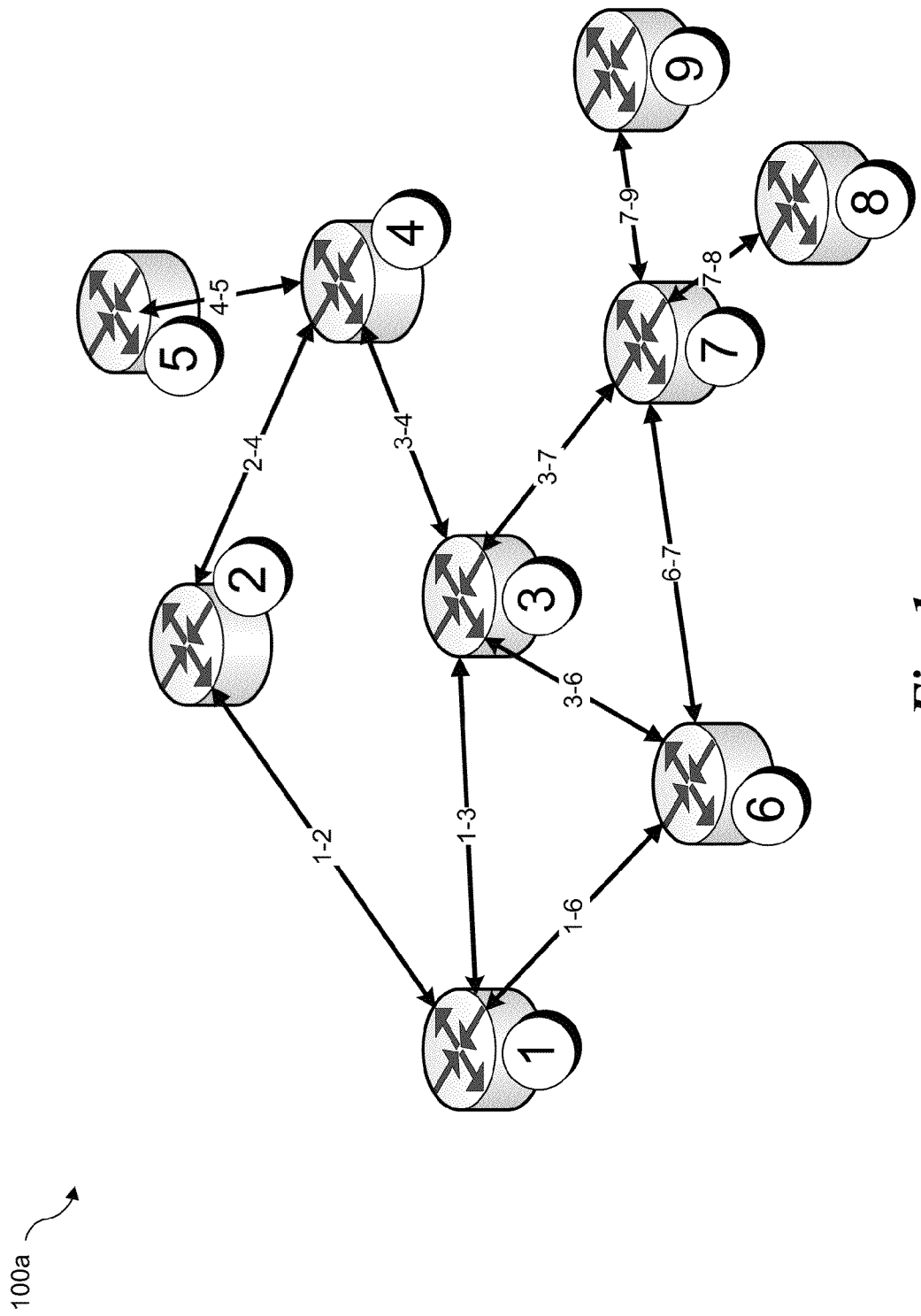
FIG. 1a shows a simplified view of the network of FIG. 1 showing the NSEs and the links.
Figure 1B:
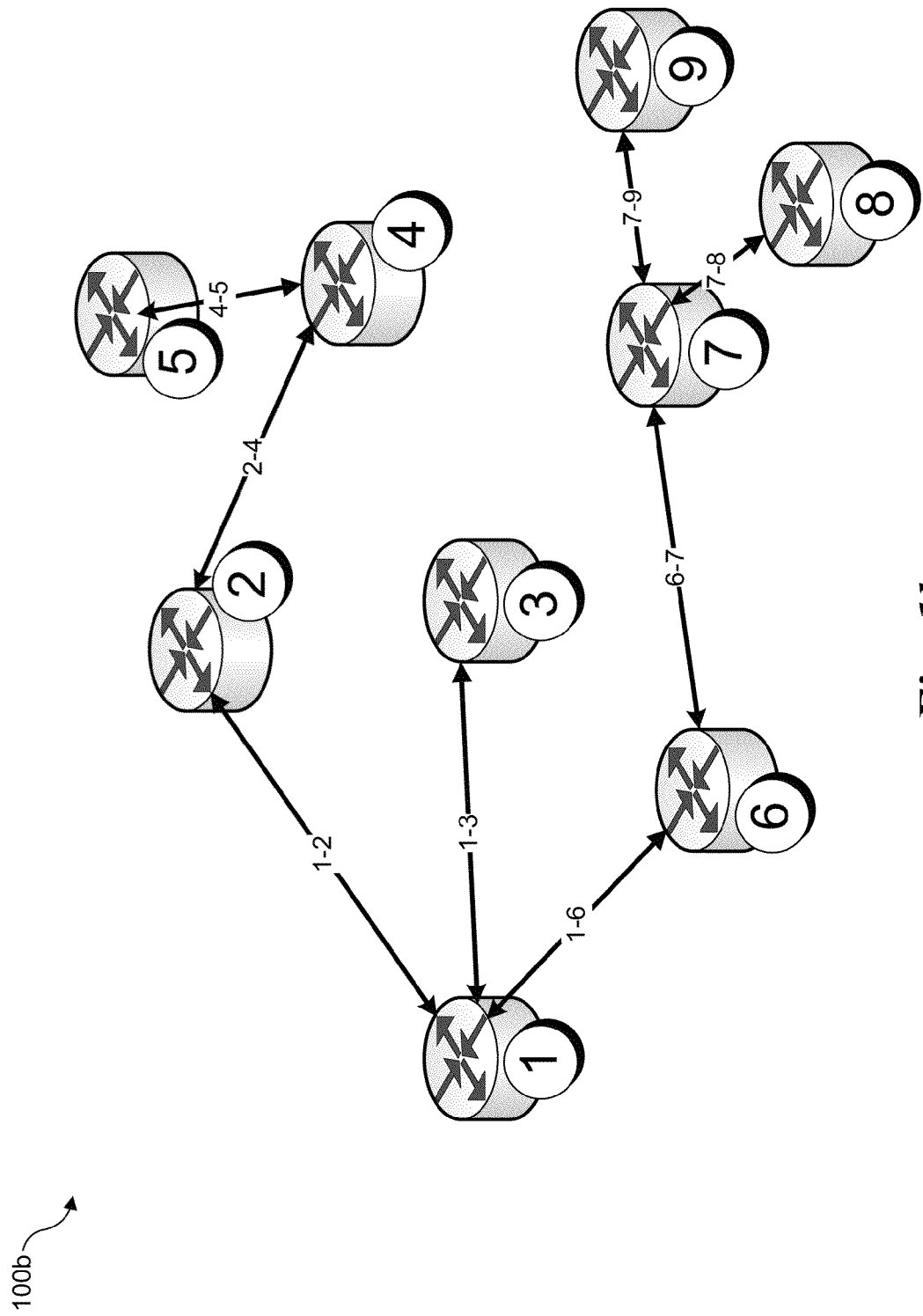
Figure 1C:
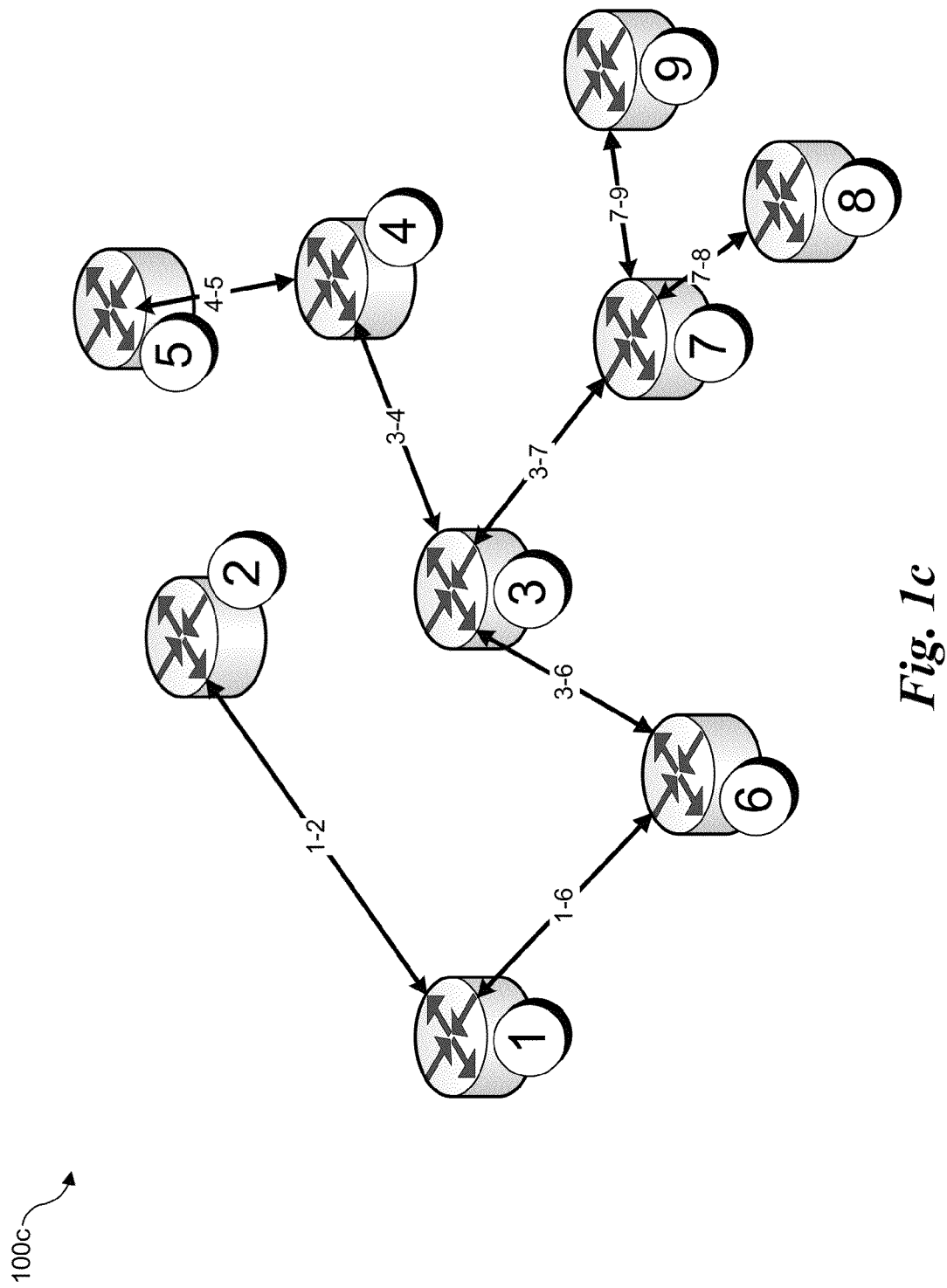
Figure 1D:
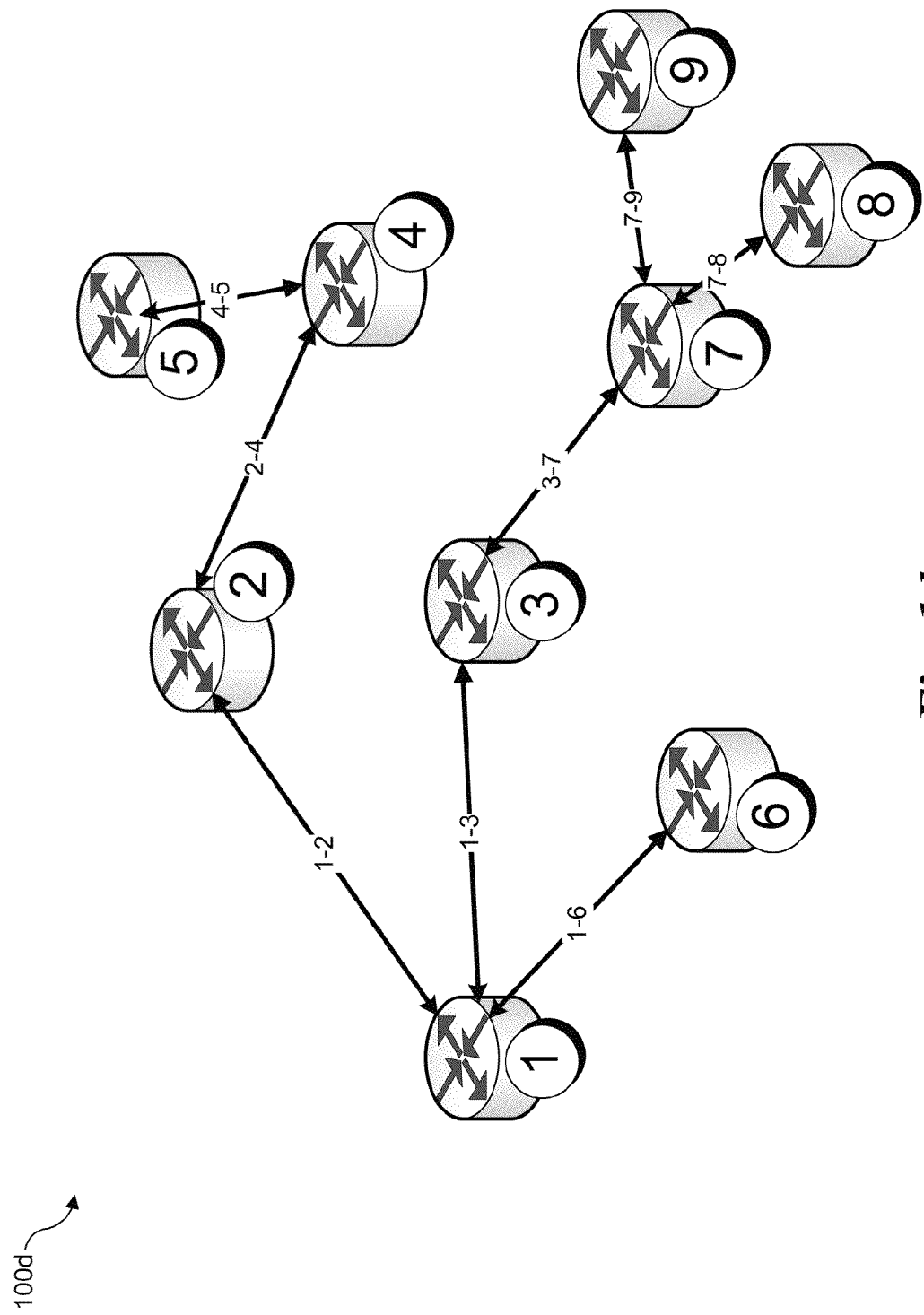

Implementation of the Spanning Tree approach may be extended to other types of network configurations besides those illustrated in FIGS. 9 and 9a-9f. For example, using a similar least path cost routing criteria, Spanning Trees may be determined for networks that are node-based, such as network 100. Further examples as applied to network 100 are shown in FIGS. 1a-1d. FIG. 1a illustrates a network 100a similar to network 100 including nodes 1-9 and all of the links connecting the nodes. FIG. 1b illustrates a first Spanning Tree 100b under which links 3-6, 3-7, and 6-7 are not used. FIG. 1c illustrates a second Spanning Tree 100c under which links 1-3, 2-4, and 6-7 are not used. FIG. 1d illustrates a third Spanning Tree 100d under which links 3-4, 3-6, and 6-7 are not used.

Figure 12:
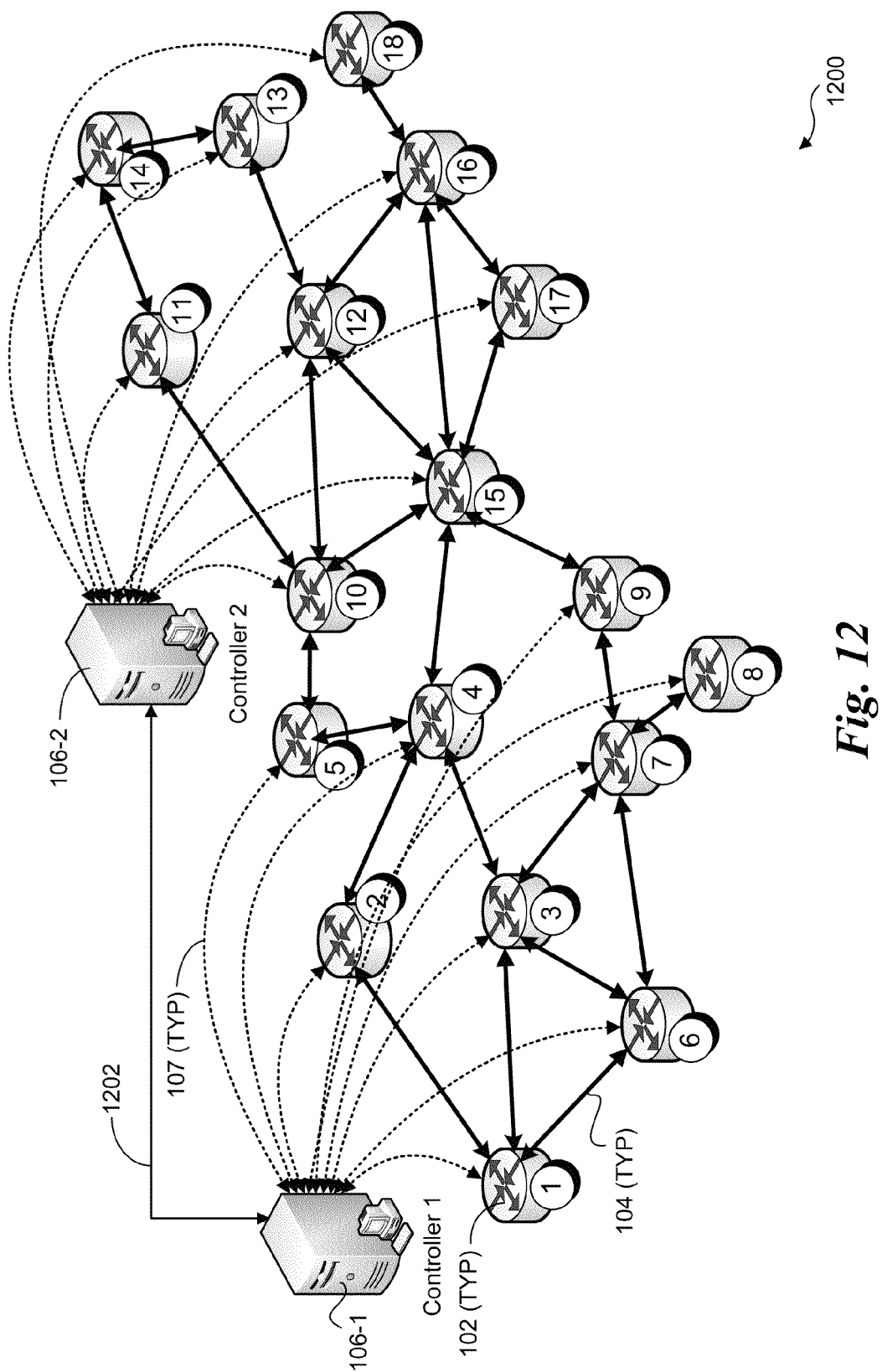
FIG. 12 illustrated a network of NSE nodes employing two controllers.

In addition to using a single controller, such as controllers 106 and 106' discussed above, a set of two or more distributed controllers may be employed. For example, FIG. 12 shows a network 1200 including 18 NSE nodes 102 (labeled 1-18) interconnected by associated links 104. Control plane aspects relating to information flows are facilitated by two controllers 106-1 and 106-2. As shown, each of controllers 106-1 and 106-2 is in communication with a respective set of NSE nodes 102 via secure links 107, where each set of NSE nodes represents a control domain. For example, the control domain of controller 106-1 includes nodes 1-9, and the control domain of controller 106-2 includes nodes 10-18. In one embodiment, controllers in a distributed set of controllers are linked in communication, such as depicted by a controller communication channel 1202. This enables the controllers to assign and manage information flows in a coordinated manner, such as for situations where information flows are routed between control domains.

In some embodiments, a master-slave controller scheme may be implemented, wherein one of the controllers in a distributed set of controllers operates as a master controller, and the other controllers operate as slave controllers. In general, the masters and slave controllers may operate in an autonomous manner when managing information flows within their own domains, but the master is responsible for coordinating assignment of information flows that cross control domains for the NSEs corresponding to the domain crossing point. For example, domain crossing points for network 1200 include the links between NSE nodes 5 and 10, 4 and 15, and 9 and 15.

In general, the assignment for information flows for these domain-crossing nodes will be implemented by the controller for the domain each node is in; however, there will be coordination between the controllers such that the information flows are configured correctly. At the same time, the routing of the information flows within a given domain may be controlled by the controller for that domain. For example, an information flow between nodes 1 and 18 will result in routing within two domains (i.e., domains for each of controllers 106-1 and 106-2). Accordingly, the controllers will coordinate which of the cross domain links will be used. However, each controller may be responsible for NSE flow assignments for the information flow while within their respective domains.

In addition to computer networks such as Ethernet networks, aspects of the embodiments may be implemented for other systems and apparatus that may be configured to employ flow control. For instance, routing information flows via interconnects employed for board-level interconnected communication system where interconnected components exchange data at high speeds may be configured to implement flow control techniques consistent with the present disclosure. The principles and teachings herein may also be applied to System on a Chip (SoC) employing network-based routing of data between various processing and data resources.

Figure 13:
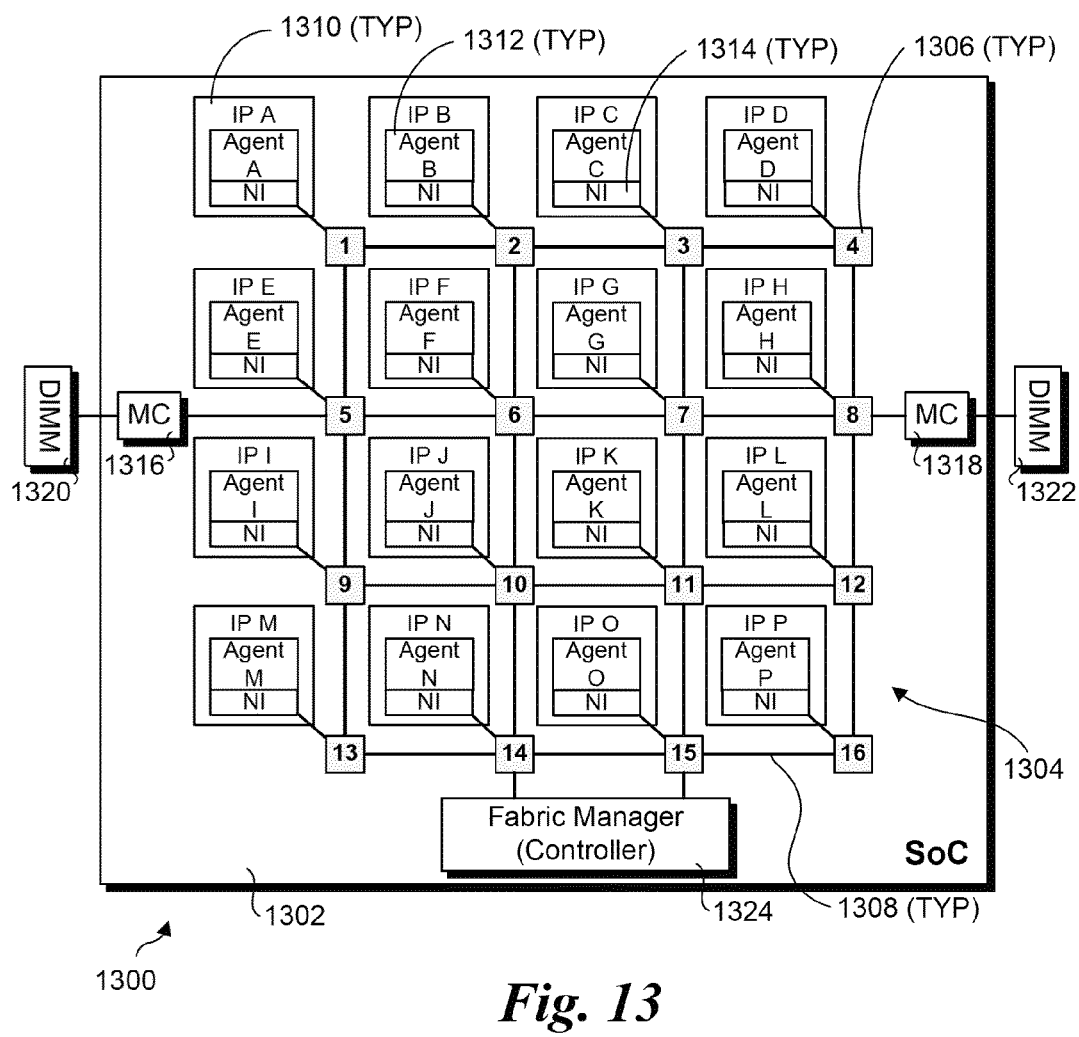
FIG. 13 is a schematic block diagram of an exemplary System on a Chip employing a Network on a Chip.

For example, FIG. 13 shows a system 1300 including an SoC 1302 employing a Network on a Chip (NoC) 1304 employing a network-based routing scheme. NoC 1304 comprises a 2D Mesh interconnect fabric having a router 1306 proximate to each crossbar intersection and comprising a plurality of interconnect links 1308. The routers are also numbered 1-16 and are configured to be implemented as NSE nodes. A plurality of IP (Intellectual Property) blocks 1310 are coupled to respective routers 1306, forming a 2D array of IP blocks. Although 16 IP blocks are shown in FIG. 13, this is merely illustrative, as the number of IP blocks can vary from a lesser number of IP blocks to many more, such as but not limited to 8, 24, 32, 48, 64, etc., as well as number in-between.

Each IP block includes an agent 1312 and a network interface 1314. The IP blocks are illustrative of various types of IP block commonly used in SoCs, such as processor cores, hardware accelerators (e.g., video decoders, graphics, imaging, etc), memory-related components (e.g., memory controllers), and I/O interfaces (e.g., PCIe, QPI, etc.). In the illustrated embodiment, a pair of memory controllers 1316 and 1318 are depicted as coupled to respective memory blocks 1320 and 1322 (depicted as DIMM (Dual in-line Memory Modules)) and to respective routers in NoC 1304. Also depicted is a fabric manager 1324, which operates in a manner similar to the controllers described herein. As will be recognized by those skilled in the art, an actually SoC would include additional components that are not shown in order to not obscure the NoC aspects illustrated in FIG. 13.

In addition to logic for facilitating the various operations, each network interface 1314 will include provisions for interfacing with the application interconnect fabric. For example, an interconnect fabric may comprises a serial multi-lane interconnect structure, such as Intel's QUICKPATH INTERCONNECT® (QPI), or Intel's KEIZER TECHNOLOGY INTERCONNECT® (KTI), an Open Core Protocol interconnect, other types of standardized or proprietary interconnects, as well as future interconnect technologies and protocols. Furthermore, the configuration of the NoC may include other types of interconnect fabric configurations, such as but not limited to torus and 3D mesh interconnects (e.g., an interconnect fabric that may be employed in future three-dimensional SoCs having IP blocks configured in a 3D array).

Under various embodiments, status information may be generated by routers 1306, network interfaces 1314, or agents 1312. Rather than employing processing resources such as processor, each of routers 1306 includes embedded logic for facilitating network switching operations. Accordingly, the amount and type of status information generated by routers 1306, network interfaces 1314, or agents 1312 will differ from that illustrated in FIGS. 11a and 11b. However, similar principles may be applied for managing information flows in NoC 1304 as are presented for other embodiments herein.

Exemplary Implementation Environment and Blade Server Architecture

In accordance with some embodiments, it is envisioned that aspects of the controllers, NSEs and information flow routing herein may be implemented in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers. For reliability purposes, portions of the servers are employed for data replication, such that if a given server goes down, there is still at least one other server with an instance of the data (generally, there will be multiple backup instance). In addition, some cloud services employ geographic data replication, under which data is replicated across data centers at separate geographic locals so that if communication to one of the data centers is compromised, cloud services may be facilitated via another data center.

As an overview, typical blade server components and systems are shown in FIGS. 14*a-c*, and 15. Under a typical configuration, a rack-mounted chassis 1400 is employed to provide power and communication functions for a plurality of server blades (i.e., blades) 1402, each of which occupies a corresponding slot. (It is noted that all slots in a chassis do not need to be occupied.) In turn, one or more chassis 1400 may be installed in a blade server rack 1403 shown in FIG. 14*c*. Each blade is coupled to an interface plane 1404 (i.e., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 14A:
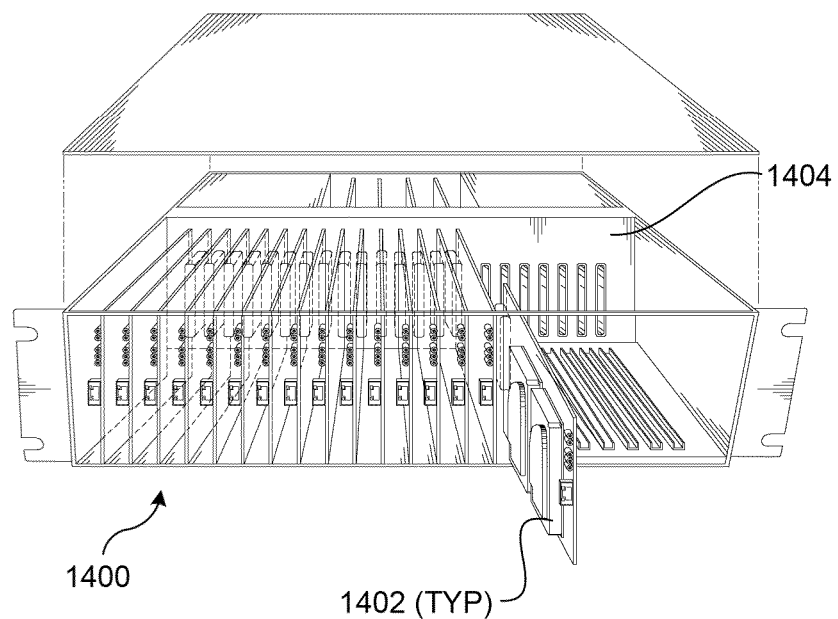
FIG. 14a is a frontal isometric view of an exemplary blade server chassis in which a plurality of server blades are installed.
Figure 14B:
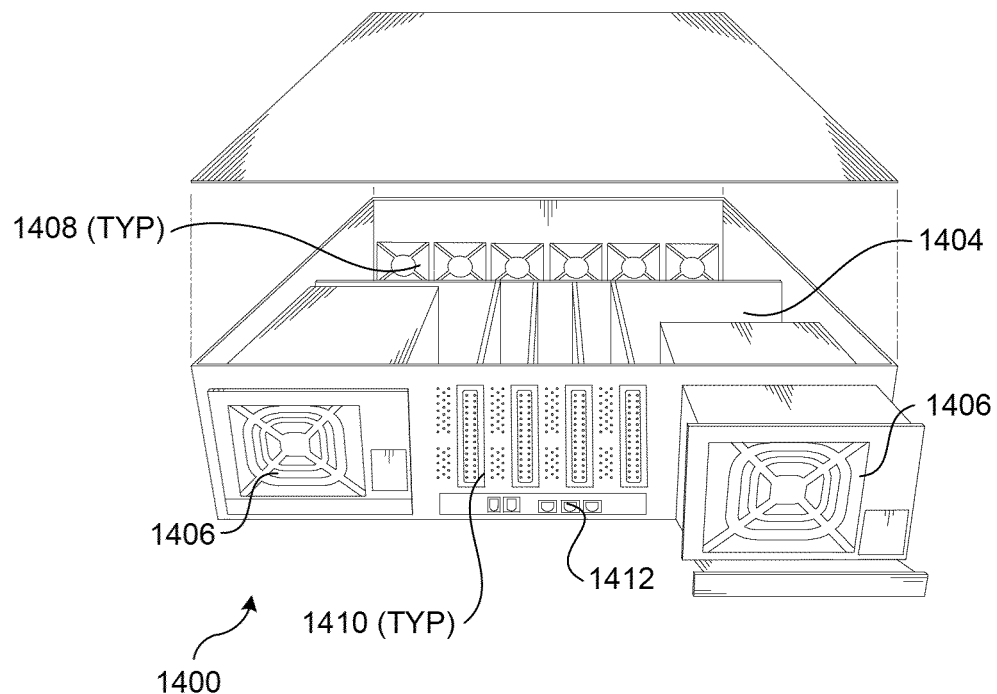
Figure 14C:
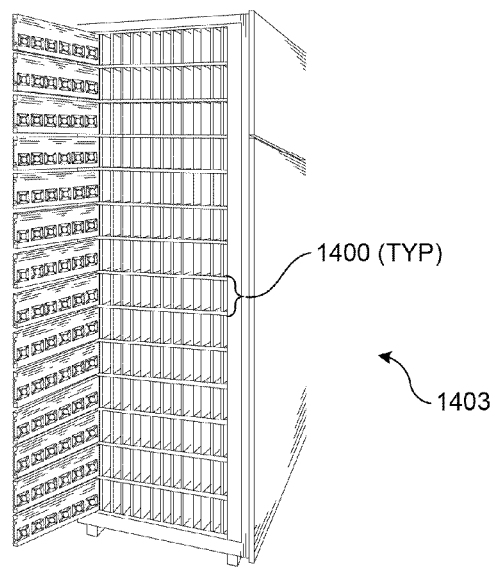
FIG. 14c is an isometric frontal view of an exemplary blade server rack in which a plurality of rack-mounted blade server chassis corresponding to FIGS. 14a and 14b are installed.

A typical mid-plane interface plane configuration is shown in FIGS. 14*a* and 14*b*. The backside of interface plane 1404 is coupled to one or more power supplies 1406. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 1408 are employed to draw air through the chassis to cool the server blades.

An important feature required of all blade servers is the ability to communicate externally with other IT infrastructure. This is typically facilitated via one or more network connect cards 1410, each of which is coupled to interface plane 1404. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 1412 that is coupled to the backside or frontside of the interface plane. As yet another option, a management or configuration server may be employed to manage blade activities, wherein communications are handled via standard computer networking infrastructure, for example, Ethernet.

Figure 15:
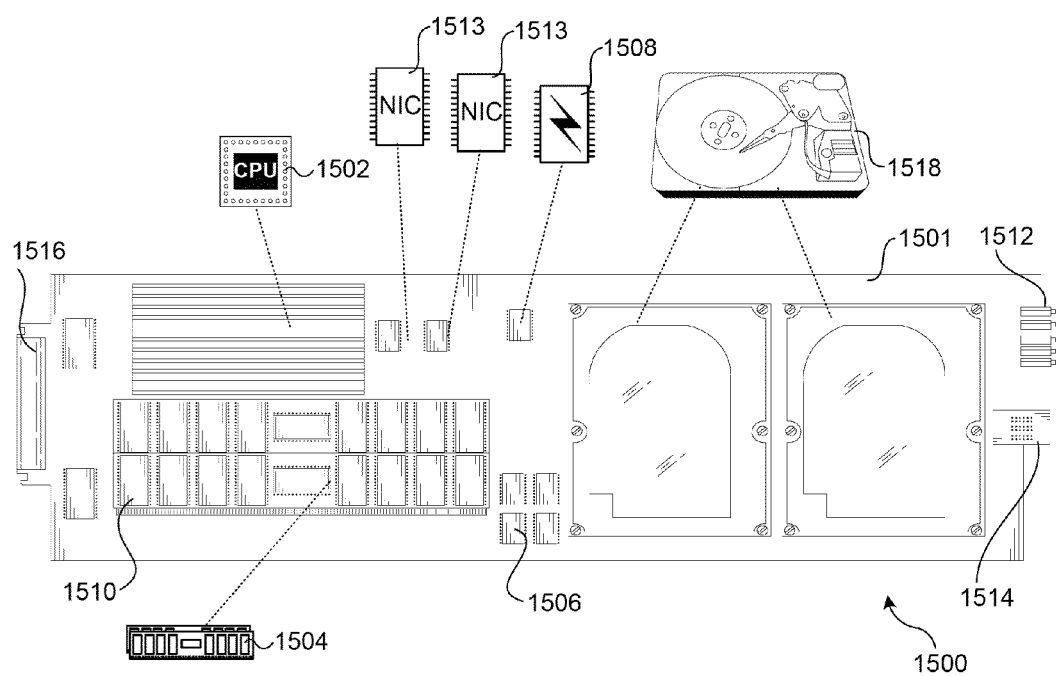
FIG. 15 shows details of the components of a typical server blade, according to one embodiment.

With reference to FIG. 15, further details of an exemplary blade 1500 are shown. As discussed above, each blade comprises a separate computing platform that is configured to perform server-type functions, i.e., is a "server on a card." Accordingly, each blade includes components common to conventional servers, including a main printed circuit board (main board) 1501 providing internal wiring (i.e., buses) for coupling appropriate integrated circuits (ICs) and other components mounted to the board. These components include one or more processors 1502 coupled to system memory 1504 (e.g., some form of Random Access Memory (RAM)), cache memory 1506 (e.g., SDRAM), and a firmware storage device 1508 (e.g., flash memory). A "public" NIC (network interface controller) chip 1510 is provided for supporting conventional network communication functions, such as to support communication between a blade and external network infrastructure. Other illustrated components include status LED (light-emitting diodes) 1512, one or more NICs 1513 coupled to a set of RJ-45 console ports 1514 (only one of which is shown for simplicity), and an interface plane connector 1516. Additional components include various passive components (i.e., resistors, capacitors), power conditioning components, and peripheral device connectors.

Generally, each blade 1500 may also provide on-board storage. This is typically facilitated via one or more built-in disk controllers and corresponding connectors to which one or more disk drives 1518 are coupled. For example, typical disk controllers include SATA controllers, SCSI controllers, and the like. As an option, the disk drives may be housed separate from the blades in the same or a separate rack, such as might be the case when a network-attached storage (NAS) appliance or backend storage sub-system that is employed for storing large volumes of data.

NICs 1513 comprise circuitry and logic for facilitating corresponding networking operations, such as support for physical layer (L1) and data link layer operations (L2). Typically, upper layer operations are facilitated by an operating system network stack that would be hosted by an operating system running on processor 1502. However, in some embodiments, a NIC may employ its own network stack via embedded logic or the like.

In a typical data center deployment, network switching elements comprise rack-mounted equipment, such as would occupy a 1U, 2U, or 4U slot, or may be implemented via one or more server blades. Optionally, a network switching element may be implemented use one or more server blades.

In general, aspects of the information flow management and spanning tree determination protocols may be implemented via software, hardware (via, e.g., embedded logic), or a combination of the two. For example, a network element may include a processor running a software-based network stack and associated logic implemented via software for performing aspects of the operations described herein. Optionally, similar logic could be implemented via embedded logic in a NIC, large-scale network interface, or the like.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for routing information flows in a network including a plurality of network switching elements (NSE) and a plurality of links, each NSE communicatively coupled via at least one link to at least one other NSE and communicatively coupled to a controller, the method comprising:
   receiving status information from the NSEs, the status information including data relating to processor resources used by the NSEs to facilitate routing of information flows assigned to the NSEs;
   determining link path costs for routing paths between the NSEs in the network using data including the data relating to the processor resources in the status information for the NSEs;
   computing a spanning tree comprising a link path routing tree that enables each NSE to reach each other NSE and has no looped paths, the link paths in the spanning tree determined as a function of the link path costs; and
   assigning information flows to the NSEs in the network so as to route information flows via the link paths in the spanning tree,
   wherein the data relating to processor resources in the status information for an NSE includes a capability information and utilization information for at least one processor in the NSE.

2. The method of claim of claim 1, further comprising generating the status information at at least one NSE.

3. The method of claim 1, wherein the NSEs are configured to operate as software-based switches.

4. The method of claim 3, further comprising assigning information flows in accordance with the OpenFlow Switch Specification.

5. The method of claim 1, wherein the network comprises a plurality of Ethernet segments, each coupled to at least one NSE, and wherein the spanning tree is computed using the Spanning Tree Protocol.

6. The method of claim 1, wherein the network comprises a plurality of NSE nodes coupled via a plurality of Ethernet links.

7. The method of claim 1, further comprising:
   re-computing a new spanning tree having a different configuration than a spanning tree used in determining one or more existing information flows; and
   re-assigning at least one existing information flow that is routed over a link that is not in the new spanning tree to be rerouted using link paths in the new spanning tree.

8. The method of claim 7, further comprising periodically re-computing the spanning tree.

9. The method of claim 1, further comprising:
   receiving status information from the NSEs, the status information including data relating to processor resources used by the NSEs to facilitate routing of information flows assigned to the NSEs; and
   employing the status information in assigning information flows to the NSEs.

10. The method of claim 1, further comprising employing a plurality of controllers to assign information flows in the network.

11. A controller, comprising:
a processing module, including at least one processor;
a communication interface, operatively coupled to the processing module; and
storage, operatively coupled to the processing module, in which instructions are stored that are configured to be executed via the processing module to cause the controller to perform operations when the controller is operated in a network comprising a plurality of switching elements (NSEs) and a plurality of links each NSE comprising a node in a network communicatively coupled via at least one link to at least one other NSE, the operations including,
receiving status information from the NSEs via the communication interface, the status information received from the NSEs including data relating to processor resources used by the NSE to facilitate routing of information flows assigned to the NSEs;
determining link path costs for routing paths between the nodes in the network using data including the data relating to the processor resources in the status information received from the NSEs;
computing a spanning tree comprising a link path routing tree that enables each node to reach each other node and has no looped paths, the link paths in the spanning tree determined as a function of the link path costs; and
assigning information flows to the NSEs in the network so as to route information flows between nodes in the network via the link paths in the spanning tree,
wherein the data relating to processor resources in the status information for an NSE includes a capability information and utilization information for at least one processor in the NSE.

12. The controller of claim 11, wherein the NSEs comprise software-based switches employing flow tables, and the instruction flows assigned by the controller are configured in accordance with the OpenFlow Switch Specification.

13. The controller of claim 11, wherein the network comprises a plurality of Ethernet segments, each coupled to at least one NSE, and wherein the spanning tree is computed using the Spanning Tree Protocol.

14. The controller of claim 11, wherein execution of the instructions further cause the controller to perform operations when operated comprising:
receiving status information from a plurality of NSEs via the communication interface, the status information including data relating to processor resources used by the NSEs to facilitate routing of information flows assigned to the NSEs;
re-computing a new spanning tree having a different configuration than a spanning tree used in determining one or more existing information flows; and
re-assigning at least one existing information flow that is routed over a link that is not in the new spanning tree to be rerouted using link paths in the new spanning tree.

15. The controller of claim 11, wherein execution of the instructions further cause the controller to perform operations when operated comprising:
receiving status information from a plurality of NSEs, the status information including data relating to resources used by the NSEs to facilitate routing of information flows assigned to the NSEs; and
employing the status information in assigning information flows to the NSEs.

16. A tangible non-transitory machine-readable medium having instructions stored thereon configured to be executed by a controller when operating in a network comprising a plurality of network switching elements (NSE) and a plurality of links, each NSE communicatively coupled via at least one link to at least one other NSE and communicatively coupled to the controller when the controller is operating, wherein execution of the instructions by the controller enables the controller to perform operations comprising:
receiving status information from the NSEs, the status information including data relating to processor resources used by the NSEs to facilitate routing of information flows assigned to the NSEs;
determining link path costs for routing paths between the NSEs in the network using data including the data relating to the processor resources in the status information for the NSEs;
computing a spanning tree comprising a link path routing tree that enables each NSE to reach each other NSE and has no looped paths, the link paths in the spanning tree determined as a function of the link path costs; and
assigning information flows to the NSEs in the network so as to route information flows via the link paths in the spanning tree,
wherein the data relating to processor resources in the status information for an NSE includes a capability information and utilization information for at least one processor in the NSE.

17. The tangible non-transitory machine-readable medium of claim 16, wherein the NSEs comprise software-based switches employing flow tables, and the instruction flows assigned by the controller are configured in accordance with the OpenFlow Switch Specification.

18. The tangible non-transitory machine-readable medium of claim 16, wherein execution of the instructions enables the controller to perform further operations comprising:
receiving status information from a plurality of NSEs via the communication interface, the status information including data relating to resources used by the NSEs to facilitate routing of information flows assigned to the NSEs;
re-computing a new spanning tree having a different configuration than a spanning tree used in determining one or more existing information flows; and
re-assigning at least one existing information flow that is routed over a link that is not in the new spanning tree to be rerouted using link paths in the new spanning tree.

19. The tangible non-transitory machine-readable medium of claim 16, wherein execution of the instructions enables the controller to perform further operations comprising:
receiving status information from a plurality of NSEs, the status information including data relating to resources used by the NSEs to facilitate routing of information flows assigned to the NSEs; and
employing the status information in assigning information flows to the NSEs.

20. A system comprising:
a network including a plurality of network switching elements (NSEs) and a plurality of links, each NSE communicatively coupled via at least one link to at least one other NSE; and
a first controller, communicatively coupled to each NSE and configured to perform operations comprising:
receiving status information from the NSEs, the status information including data relating to processor resources used by the NSEs to facilitate routing of information flows assigned to the NSEs;

determining link path costs for routing paths between NSEs in the network, the link path costs derived at least in part via use of the data relating to processor resources in the status information;

computing a spanning tree comprising a link path routing tree that enables each NSE to reach each other NSE and has no looped paths, the link paths in the spanning tree determined as a function of the link path costs; and assigning information flows to NSEs in the network so as to route information flows via the link paths in the spanning tree, wherein the data relating to processor resources in the status information for an NSE includes at least one of capability information and utilization information for at least one processor in the NSE.

21. The system of claim 20, wherein the NSEs are configured to operate as software-based switches, and the information flows are configured in accordance with the OpenFlow Switch Specification.

22. The system of claim 20, wherein the network comprises a plurality of Ethernet segments, each coupled to at least one NSE, and wherein the spanning tree is computed using the Spanning Tree Protocol.

23. The system of claim 20, wherein the network comprises a plurality of NSE nodes coupled together via a plurality links, wherein each NSE is coupled to at least one other NSE via at least one direct link.

24. The system of claim 20, further comprising a plurality of controllers including the first controller, each controller have a configuration similar to the first controller and configured to assign information flows to at least a portion of the NSEs.

25. The system of claim 20, wherein the network comprises a network on a chip, and the first controller comprises a fabric manager.

* * * * *